(12) United States Patent
Eigner et al.

(10) Patent No.: US 10,579,823 B2
(45) Date of Patent: *Mar. 3, 2020

(54) SYSTEMS AND METHODS FOR SECURE HIGH SPEED DATA GENERATION AND ACCESS

(71) Applicant: Ubiq Security, Inc., San Diego, CA (US)

(72) Inventors: Linda Eigner, La Jolla, CA (US); William Eigner, La Jolla, CA (US); Anthony Iasi, San Diego, CA (US); Charles Kahle, Escondido, CA (US); Gary Schneir, Carlsbad, CA (US); Eric Tobias, La Jolla, CA (US)

(73) Assignee: Ubiq Security, Inc., San Diego, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/985,560

(22) Filed: May 21, 2018

(65) Prior Publication Data
US 2018/0276408 A1 Sep. 27, 2018

Related U.S. Application Data

(63) Continuation-in-part of application No. 15/984,688, filed on May 21, 2018, which is a continuation of
(Continued)

(51) Int. Cl.
G06F 21/62 (2013.01)
(52) U.S. Cl.
CPC ...... G06F 21/6245 (2013.01); G06F 21/6227 (2013.01); G06F 21/6254 (2013.01)

(58) Field of Classification Search
CPC .. G06F 21/6245; G06F 21/6227; G06F 15/16; G06F 21/6254; G06F 21/62; H04L 9/32
(Continued)

(56) References Cited

U.S. PATENT DOCUMENTS 5,367,619 A   11/1994 Dipaolo et al.
5,563,998 A   10/1996 Yaksich et al.
(Continued)

FOREIGN PATENT DOCUMENTS

EP   1522947 A2   4/2005
GB   2514428 A   11/2014
(Continued)

OTHER PUBLICATIONS

Extended European Search Report for related European Application No. 15844963.7, dated Apr. 10, 2018; 7 pages.
(Continued)

Primary Examiner — Ashokkumar B Patel
Assistant Examiner — Quazi Farooqui
(74) Attorney, Agent, or Firm — Procopio, Cory, Hargreaves & Savitch LLP; Mark W. Catanese

(57) ABSTRACT

Systems and methods for generating a data map for retrieval of a data object. An example method includes: receiving an indication to generate a data entry for the data map, the data entry corresponding to a field identifier and a field value related to the field identifier; obfuscating the field identifier to generate a record locator associated with the data entry based, at least in part, on one or more variable storage parameters; and encrypting the field identifier and field value and storing the data entry in the data map as an encrypted field identifier and field value in association with the record locator.

19 Claims, 22 Drawing Sheets

Related U.S. Application Data application No. 15/922,789, filed on Mar. 15, 2018, which is a continuation of application No. 15/833,345, filed on Dec. 6, 2017, which is a continuation of application No. 14/863,294, filed on Sep. 23, 2015, now Pat. No. 9,842,227.

(60) Provisional application No. 62/167,227, filed on May 27, 2015, provisional application No. 62/119,794, filed on Feb. 23, 2015, provisional application No. 62/057,225, filed on Sep. 29, 2014, provisional application No. 62/054,310, filed on Sep. 23, 2014.

(58) Field of Classification Search
USPC .......................................................... 713/193
See application file for complete search history.

(56) References Cited

U.S. PATENT DOCUMENTS

| | | |
|---|---|---|
| 5,664,109 A | 9/1997 | Johnson et al. |
| 5,924,069 A | 7/1999 | Kowalkowski et al. |
| 6,067,551 A | 5/2000 | Brown et al. |
| 6,088,700 A | 7/2000 | Larsen et al. |
| 6,192,380 B1 | 2/2001 | Light et al. |
| 6,247,029 B1 | 6/2001 | Kelley et al. |
| 6,651,217 B1 | 11/2003 | Kennedy et al. |
| 6,662,340 B2 | 12/2003 | Rawat et al. |
| 6,681,017 B1 | 1/2004 | Matias et al. |
| 6,820,204 B1 | 11/2004 | Desai et al. |
| 6,851,087 B1 | 2/2005 | Sibert |
| 6,941,291 B1 | 9/2005 | Zoller et al. |
| 7,092,952 B1 | 8/2006 | Wilens |
| 7,103,915 B2 | 9/2006 | Redlich et al. |
| 7,133,937 B2 | 11/2006 | Leavitt |
| 7,181,438 B1 | 2/2007 | Szabo |
| 7,203,699 B2 | 4/2007 | Bellamy |
| 7,216,292 B1 | 5/2007 | Snapper et al. |
| 7,299,240 B1 | 11/2007 | Crozier |
| 7,334,184 B1 | 2/2008 | Simons |
| 7,343,551 B1 | 3/2008 | Bourdev |
| 7,350,139 B1 | 3/2008 | Simons |
| 7,500,178 B1 | 3/2009 | O'Donnell |
| 7,676,526 B1 | 3/2010 | Beloussov et al. |
| 7,779,345 B2 | 8/2010 | Topalov et al. |
| 7,810,027 B2 | 10/2010 | Bendik |
| 7,999,810 B1 | 8/2011 | Boice et al. |
| 8,019,664 B1 | 9/2011 | Tifford et al. |
| 8,082,144 B1 | 12/2011 | Brown et al. |
| 8,099,599 B2 | 1/2012 | Folta et al. |
| 8,260,806 B2 | 9/2012 | Steele et al. |
| 8,327,141 B2 | 12/2012 | Vysogorets |
| 8,386,706 B2 | 2/2013 | Koeppe et al. |
| 8,407,224 B2 | 3/2013 | Bach et al. |
| 8,489,643 B1 | 7/2013 | Rubanovich et al. |
| 8,639,920 B2 | 1/2014 | Stack et al. |
| 8,649,521 B2 | 2/2014 | Grube et al. |
| 8,661,045 B2 | 2/2014 | Raz et al. |
| 8,676,683 B1 | 3/2014 | Chheda et al. |
| 8,782,437 B2 | 7/2014 | Rashkovskiy et al. |
| 9,087,212 B2 | 7/2015 | Balakrishnan et al. |
| 9,158,927 B1 | 10/2015 | Franklin et al. |
| 9,268,758 B2 | 2/2016 | Gonser et al. |
| 9,455,963 B1 | 9/2016 | Roth et al. |
| 9,590,989 B2 | 3/2017 | Spagnola |
| 9,665,638 B2 | 5/2017 | Eigner et al. |
| 9,672,336 B1 | 6/2017 | Spence |
| 9,842,227 B2 | 12/2017 | Eigner et al. |
| 10,298,556 B2 | 5/2019 | Iasi et al. |
| 2001/0047381 A1 | 11/2001 | Meno et al. |
| 2002/0049686 A1 | 4/2002 | Chuang et al. |
| 2002/0049689 A1 | 4/2002 | Venkatram |
| 2002/0062342 A1 | 5/2002 | Sidles |
| 2002/0082997 A1 | 6/2002 | Kobata et al. |
| 2002/0111888 A1 | 8/2002 | Stanley et al. |
| 2002/0156846 A1 | 10/2002 | Rawat et al. |
| 2002/0194062 A1 | 12/2002 | Linde |
| 2003/0014528 A1 | 1/2003 | Crutcher et al. |
| 2003/0028792 A1 | 2/2003 | Plow et al. |
| 2003/0130951 A1 | 7/2003 | Chess et al. |
| 2003/0204602 A1 | 10/2003 | Hudson et al. |
| 2003/0233316 A1 | 12/2003 | Hu et al. |
| 2004/0049700 A1 | 3/2004 | Yoshida |
| 2005/0028082 A1 | 2/2005 | Topalov et al. |
| 2005/0050052 A1 | 3/2005 | Zimmerman et al. |
| 2005/0071342 A1 | 3/2005 | Calusinski |
| 2005/0257148 A1 | 11/2005 | Goodman et al. |
| 2006/0023875 A1 | 2/2006 | Graunke |
| 2006/0168509 A1 | 7/2006 | Boss et al. |
| 2006/0194186 A1 | 8/2006 | Nanda |
| 2007/0033118 A1 | 2/2007 | Hopkinson |
| 2007/0061393 A1 | 3/2007 | Moore |
| 2007/0078885 A1 | 4/2007 | Klein |
| 2007/0113078 A1 | 5/2007 | Witt et al. |
| 2007/0143261 A1 | 6/2007 | Uppala |
| 2007/0154018 A1 | 7/2007 | Watanabe |
| 2007/0198854 A1 | 8/2007 | Suzuki |
| 2007/0208665 A1 | 9/2007 | Ohara |
| 2007/0250348 A1 | 10/2007 | D'Ambrosia et al. |
| 2007/0256005 A1 | 11/2007 | Schneider et al. |
| 2008/0022012 A1 | 1/2008 | Wang |
| 2008/0071786 A1 | 3/2008 | Swanburg et al. |
| 2008/0120257 A1 | 5/2008 | Goyal et al. |
| 2008/0126357 A1 | 5/2008 | Casanova et al. |
| 2008/0155664 A1 | 6/2008 | Lieber |
| 2008/0215976 A1 | 9/2008 | Bierner et al. |
| 2008/0235567 A1 | 9/2008 | Raj et al. |
| 2009/0006646 A1 | 1/2009 | Duarte |
| 2009/0006940 A1 | 1/2009 | Hardt |
| 2009/0030910 A1 | 1/2009 | Bennett et al. |
| 2009/0161870 A1 | 6/2009 | Rosenberg |
| 2009/0222412 A1 | 9/2009 | Lee et al. |
| 2009/0254971 A1 | 10/2009 | Herz et al. |
| 2009/0327321 A1 | 12/2009 | McCormack et al. |
| 2010/0049774 A1 | 2/2010 | Pathak et al. |
| 2010/0058061 A1 | 3/2010 | Folta et al. |
| 2010/0088269 A1 | 4/2010 | Buller et al. |
| 2010/0217684 A1 | 8/2010 | Melcher et al. |
| 2010/0241518 A1 | 9/2010 | McCann |
| 2010/0245938 A1 | 9/2010 | Coley et al. |
| 2010/0274590 A1 | 10/2010 | Compangano et al. |
| 2010/0293108 A1 | 11/2010 | Gurvitch et al. |
| 2011/0066843 A1 | 3/2011 | Newman et al. |
| 2011/0071994 A1 | 3/2011 | Tabrizi |
| 2011/0093471 A1 | 4/2011 | Brockway et al. |
| 2011/0145101 A1 | 6/2011 | Berger et al. |
| 2011/0153588 A1 | 6/2011 | Gartner et al. |
| 2011/0191114 A1 | 8/2011 | Bhagwan et al. |
| 2011/0282941 A1 | 11/2011 | Chan et al. |
| 2011/0289010 A1 | 11/2011 | Rankin, Jr. et al. |
| 2012/0047100 A1 | 2/2012 | Lehner |
| 2012/0059842 A1 | 3/2012 | Hille-Doering et al. |
| 2012/0066223 A1 | 3/2012 | Schentrup et al. |
| 2012/0203733 A1 | 8/2012 | Zhang |
| 2012/0227096 A1 | 9/2012 | Edwards |
| 2012/0323574 A1 | 12/2012 | Wang et al. |
| 2012/0331088 A1 | 12/2012 | O'Hare et al. |
| 2013/0067243 A1 | 3/2013 | Tamayo-Rios et al. |
| 2013/0151866 A1 | 6/2013 | Koeppe et al. |
| 2013/0173553 A1 | 7/2013 | Apte et al. |
| 2013/0205189 A1 | 8/2013 | DiPierro et al. |
| 2013/0232038 A1 | 9/2013 | Murray |
| 2013/0290648 A1 | 10/2013 | Shao et al. |
| 2013/0318347 A1 | 11/2013 | Moffat |
| 2013/0326117 A1 | 12/2013 | Aune |
| 2013/0332804 A1 | 12/2013 | Seaman et al. |
| 2014/0032228 A1 | 1/2014 | Johri et al. |
| 2014/0082073 A1 | 3/2014 | Wable et al. |
| 2014/0122988 A1 | 5/2014 | Eigner et al. |
| 2014/0123057 A1 | 5/2014 | Eigner et al. |
| 2014/0149470 A1 | 5/2014 | Rawal |
| 2014/0173282 A1 | 6/2014 | Pascariello et al. |
| 2014/0201520 A1 | 7/2014 | Yacobi |
| 2014/0201824 A1 | 7/2014 | Agbabian |

(56) References Cited

U.S. PATENT DOCUMENTS

| | | |
|---|---|---|
| 2014/0223575 A1 | 8/2014 | Nandi et al. |
| 2014/0244317 A1 | 8/2014 | Roberts et al. |
| 2014/0250534 A1 | 9/2014 | Flores |
| 2014/0279286 A1 | 9/2014 | Ganesh et al. |
| 2014/0279893 A1 | 9/2014 | Branton |
| 2014/0310525 A1 | 10/2014 | Kohlenberg et al. |
| 2014/0331060 A1 | 11/2014 | Hayton |
| 2015/0121063 A1 | 4/2015 | Maller et al. |
| 2015/0123057 A1 | 5/2015 | Ogden |
| 2015/0244693 A1 | 8/2015 | Pate et al. |
| 2015/0294118 A1 | 10/2015 | Parker et al. |
| 2015/0371052 A1 | 12/2015 | Lepeshenkov et al. |
| 2015/0371226 A1 | 12/2015 | Hurley et al. |
| 2016/0085996 A1 | 3/2016 | Eigner et al. |
| 2016/0173605 A1 | 6/2016 | Iasi et al. |
| 2016/0211976 A1 | 7/2016 | Paris et al. |
| 2017/0102898 A1 | 4/2017 | Shimizu |
| 2017/0208050 A1 | 7/2017 | Iasi et al. |
| 2017/0208052 A1 | 7/2017 | Jai et al. |
| 2017/0359717 A1 | 12/2017 | Adler et al. |
| 2018/0091538 A1 | 3/2018 | Narayanan et al. |
| 2018/0176017 A1 | 6/2018 | Rodriguez et al. |
| 2018/0181964 A1 | 6/2018 | Zagarese et al. |

FOREIGN PATENT DOCUMENTS

| | | |
|---|---|---|
| JP | 2008139996 A | 6/2008 |
| KR | 1020110139798 A | 12/2011 |
| KR | 1020130108679 A | 10/2013 |
| KR | 101441581 B1 | 9/2014 |
| KR | 101520722 B1 | 5/2015 |
| KR | 1020170085020 A | 7/2017 |
| KR | 1020170110420 A | 10/2017 |
| WO | 2006081122 A2 | 8/2006 |
| WO | 2007085824 A2 | 8/2007 |
| WO | 2008065342 A1 | 6/2008 |
| WO | 2013127877 A1 | 9/2013 |
| WO | 2013149178 A2 | 10/2013 |

OTHER PUBLICATIONS

Bownik, Assited Form Filing, pp. 41-65, 2009.
Amihai Motro and Francesco Parisi-Presicce, "Blind Custodians: A Database Service Architecture That Supports Privacy Without Encryption," Data and Applications Security XIX, copyright 2005, pp. 338-352.
PCT International Search Report and Written Opinion from corresponding application PCT/US2013/067610 dated Feb. 26, 2014 (14 pages).
PCT IPRP from corresponding application PCT/US2013/067610 dated May 5, 2015 (12 pages).
PCT International Search Report from corresponding application PCT/US2015/041210 dated Oct. 30, 2015 (14 pages).
PCT International Search Report from corresponding application PCT/US2015/051782, dated Jan. 4, 2016 (11 pages).
EP Search for EP Application No. 13850795.9 dated May 24, 2016, 7 pages.
PCT International Search Report from corresponding application PCT/US2017/014451, dated Apr. 17, 2017 (8 pages).
PCT International Search Report from corresponding application PCT/US2018/037328 dated Sep. 21, 2017 (3 pages).
PCT IRPR from related application PCT/US2017/014451 dated Aug. 2, 2018 (7 pages).
PCT Written Opinion/IRPR from corresponding application PCT/US2018/037328 dated Dec. 27, 2018 (18 pages).
PCT International Search Report and Written Opinion from corresponding application PCT/US2018/037388 dated Jan. 16, 2019 (12 pages).
PCT Written Opinion from corresponding application PCT/US2018/054235 dated Feb. 26, 2019 (12 pages).
PCT Written Opinion from corresponding application PCT/US2019/021462 dated Jun. 17, 2019 (12 pages).
PCT Written Opinion from corresponding application PCT/US2019/021438 dated Jun. 20, 2019 (11 pages).
PCT Written Opinion from corresponding application PCT/US2019/021440 dated Jun. 21, 2019 (10 pages).
PCT Written Opinion from corresponding application PCT/US2019/021453 dated Jun. 26, 2019 (12 pages).
Extended EP Search for EP Application No. 1570918.8, dated Aug. 17, 2018 (18 pages).
Supplementary EP Search for EP Application No. 15870918, dated May 11, 2018 (17 pages).
Laserfiche, Quick Fileds, Extract Value From Your Information, Compulink Management Center, Inc. 2009, 11 pages.
U.S. Appl. No. 61/977,830, filed Apr. 10, 2014, Parket et al. for Pub. No. US 2015/0294118 A1.
International Search Report and Written Opinion dated Jan. 4, 2016, in corresponding International Application No. PCT/US2015/051782, 11 pages.

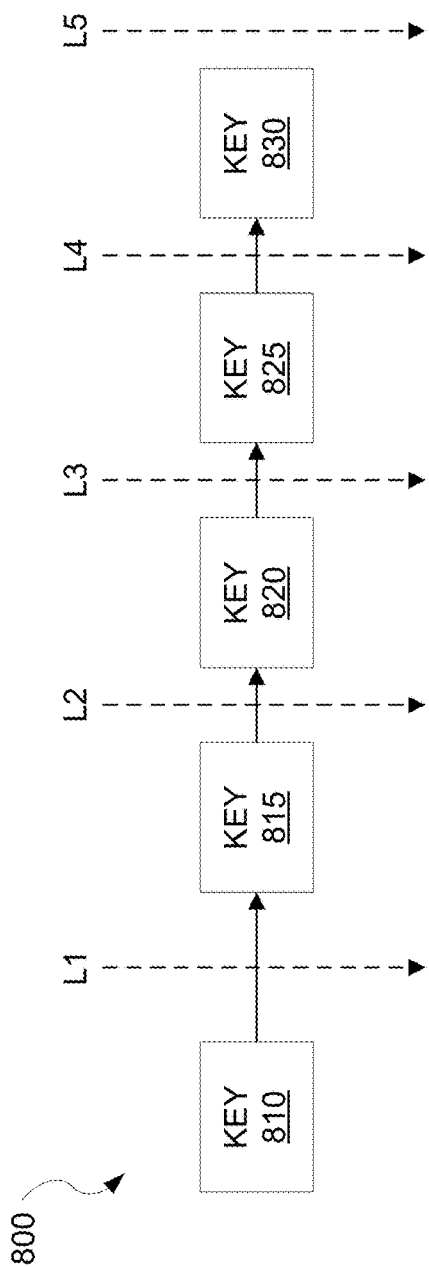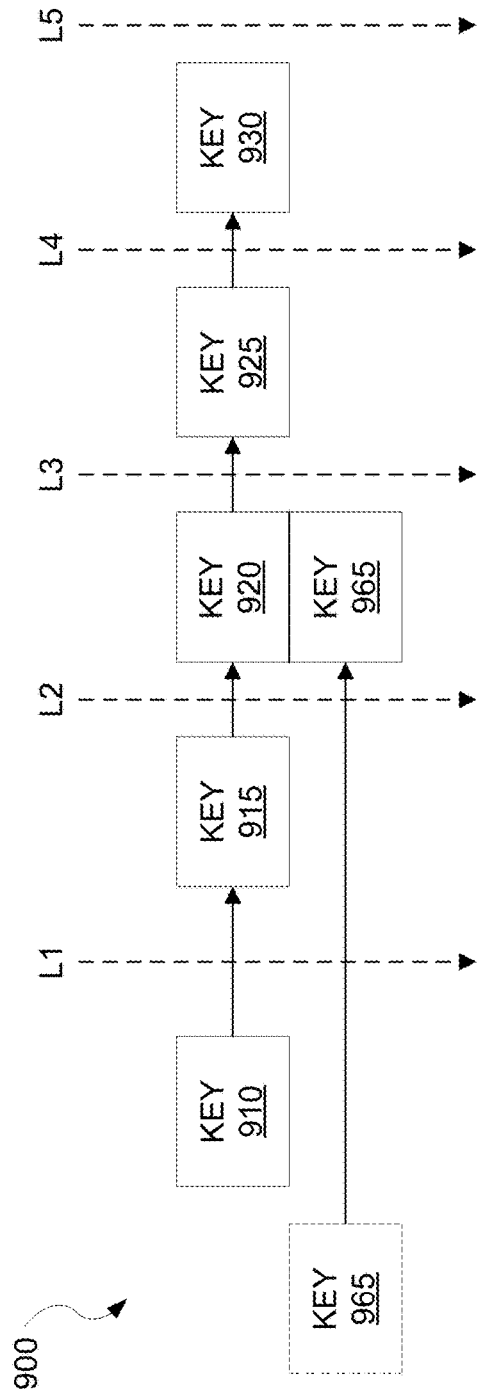

| Obfuscated Field and Account Identifiers | Encrypted Field Values |
|---|---|
| obfuscateAlgorithm(JohnSmith, Salary) | EncryptionAlgorithm($50,000.00) |
| obfuscateAlgorithm(JaneDoe, Salary) | EncryptionAlgorithm($50,000.00) |
| obfuscateAlgorithm(JohnBrown, Salary) | EncryptionAlgorithm($45,000.00) |
| obfuscateAlgorithm(JohnBrown, ZipCode) | EncryptionAlgorithm(12345) |
| obfuscateAlgorithm(JaneDoe, ZipCode) | EncryptionAlgorithm(98765) |
| obfuscateAlgorithm(JohnBrown, ZipCode) | EncryptionAlgorithm(12345) |
| obfuscateAlgorithm(JohnSmith, Age) | EncryptionAlgorithm(55) |
| obfuscateAlgorithm(JaneDoe, Age) | EncryptionAlgorithm(65) |
| obfuscateAlgorithm(JohnBrown, Age) | EncryptionAlgorithm(55) |

FIG. 12

| AAR Equality Query Keys | AAR Values |
|---|---|
| obfuscateAlgorithm({Salary, $50,000}) | EncryptionAlgorithm({JohnSmith, JaneDoe}) |
| obfuscateAlgorithm({Salary, $45,000}) | EncryptionAlgorithm({JohnBrown}) |
| obfuscateAlgorithm({ZipCode, 12345}) | EncryptionAlgorithm({JohnSmith, JohnBrown}) |
| obfuscateAlgorithm({ZipCode, 98765}) | EncryptionAlgorithm({JaneDoe}) |
| obfuscateAlgorithm({Salary, Age}, {$50,000, 55}) | EncryptionAlgorithm({JohnSmith}) |
| obfuscateAlgorithm({Salary, Age}, {$50,000, 65}) | EncryptionAlgorithm({JaneDoe}) |
| obfuscateAlgorithm({Salary, Age}, {$45,000, 55}) | EncryptionAlgorithm({JohnBrown}) |

| Field Identifiers | Field Values | AAR Values |
|---|---|---|
| obfuscateAlgorithm(Salary) | 50000 | encryptionAlgorithm(JohnSmith, JaneDoe) |
| obfuscateAlgorithm(Salary) | 45000 | encryptionAlgorithm(JohnBrown) |
| obfuscateAlgorithm(ZipCode) | 12345 | encryptionAlgorithm(JohnSmith, JohnBrown) |
| obfuscateAlgorithm(ZipCode) | 98765 | encryptionAlgorithm(JaneDoe) |
| obfuscateAlgorithm(Salary, Age) | 50000, 55 | encryptionAlgorithm(JohnSmith) |
| obfuscateAlgorithm(Salary, Age) | 50000, 65 | encryptionAlgorithm(JaneDoe) |
| obfuscateAlgorithm(Salary, Age) | 45000, 55 | encryptionAlgorithm(JohnBrown) |

| Field Identifiers | Field Values | AAR Values |
|---|---|---|
| RLO*(salary) | 55000 | SA([janedoe]) |
| RLO*(age) | 45 | SA([janedoe]) |
| RLO*(lastname) | DOE | SA([janedoe]) |

FIG. 20A

| Field Identifiers | Field Values | AAR Values |
|---|---|---|
| RLO*(age) | 50 | SA([johnsmith]) |

FIG. 20B

| Field Identifiers | Field Values | AAR Values |
|---|---|---|
| RLO*(salary) | 55000 | SA([janedoe]) |
| RLO*(age) | 45 | SA([janedoe]) |
| RLO*(lastname) | DOE | SA([janedoe]) |
| RLO*(age) | 50 | SA([johnsmith]) |

FIG. 20C

SYSTEMS AND METHODS FOR SECURE HIGH SPEED DATA GENERATION AND ACCESS

RELATED APPLICATION INFORMATION

This application is a continuation-in-part of U.S. application Ser. No. 15/984,688, filed on May 21, 2018, which is a continuation of U.S. application Ser. No. 15/922,789, filed on Mar. 15, 2018, which is a continuation of U.S. application Ser. No. 15/833,345, filed on Dec. 6, 2017, which is a continuation of U.S. application Ser. No. 14/863,294, filed on Sep. 23, 2015, issued as U.S. Pat. No. 9,842,227 on Dec. 12, 2017, which claims the benefit under 35 U.S.C. § 119(e) to U.S. Provisional Patent Application No. 62/054,310, filed on Sep. 23, 2014, U.S. Provisional Patent Application No. 62/057,225, filed on Sep. 29, 2014, U.S. Provisional Patent Application No. 62/119,794, filed on Feb. 23, 2015, and U.S. Provisional Patent Application No. 62/167,227, filed on May 27, 2015, the disclosures of all of which are incorporated herein by reference in their entireties. This application is related to U.S. patent application Ser. No. 14/061,736, filed on Oct. 23, 3013, issued as U.S. Pat. No. 9,665,638 on May 30, 2017, the disclosure of which is incorporated herein by reference in its entirety.

BACKGROUND

1. Technical Field

Various embodiments described herein relate generally to the field of electronic data security, and more particularly to the secure storage, access, recovery, and transmission of electronic data.

2. Related Art

Security of electronic data is of paramount importance for private individuals and for almost every conceivable business and government entity. A tremendous volume of electronic data is being generated, stored, and transmitted on a constant basis. Moreover, the breadth of electronic data, which nowadays inevitably extends to private and sensitive information, necessarily attracts a host of bad actors.

Conventional data security solutions are relatively static. For example, one or more data security mechanisms (e.g., password protection, encryption scheme) may be deployed at a particular data storage location. The same data security mechanisms will generally remain in place until a significant security breach is detected, at which point the entire data storage location may have already been compromised.

Data that have been stored based on standard relational data models are particularly vulnerable to unauthorized access. Individual data records (e.g., name, address, social security number, credit card number, and bank account number) stored in separate storage locations are typically accompanied by a common record locator indicating a logical nexus between the data records (e.g., associated with the same user). For example, individual data records may each be associated with the same user identification number. As such, unauthorized access to any one data record may expose sufficient information (i.e., the user identification number) to gain access to the remainder of the data records.

Although numerous data security methods are available, implementing a flexible roster of seamlessly integrated and complementary data security solutions at a single data storage location remains an enormous challenge. For example, while combining security solutions will normally increase data security, incompatibilities between different solutions may in fact give rise to additional security risks.

What is needed is a system and method that provides secure storage, high speed access, recovery, and transmission of electronic data.

SUMMARY

Systems and methods for secure storage, access, recovery, and transmission of electronic data are disclosed.

According to various embodiments, there is provided a method for generating a data map for retrieval of a data object. In some embodiments, the method includes: receiving an indication to generate a data entry for the data map, the data entry corresponding to a field identifier and a field value related to the field identifier; obfuscating the field identifier to generate a record locator associated with the data entry based, at least in part, on one or more variable storage parameters; and encrypting the field identifier and field value and storing the data entry in the data map as an encrypted field identifier and field value in association with the record locator.

According to various embodiments, there is provided a system for generating a data map a data map for retrieval of a data object. The system may include a plurality of storage locations and a secure platform. In some embodiments, the secure platform may include one or more processors configured to: receive an indication to generate a data entry for the data map, the data entry corresponding to a field identifier and a field value related to the field identifier; obfuscate the field identifier to generate a record locator associated with the data entry based, at least in part, on one or more variable storage parameters; and encrypt the field identifier and field value and storing the data entry in the data map as an encrypted field identifier and field value in association with the record locator.

Other features and advantages should become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments. It should be noted that for clarity and ease of illustration these drawings are not necessarily made to scale.

FIG. 8 illustrates a series of cascading encryption keys according to various embodiments;

FIG. 9 illustrates a series of cascading encryption keys according to various embodiments;

FIG. 12 illustrating a data collection according to various embodiments;

FIG. 13 illustrates an equality accelerated access record table according to various embodiments;

FIG. 15 illustrates a range match accelerated access record table according to various embodiments;

FIG. 20A illustrates a range match accelerated access record table according to various embodiments;

FIG. 20B illustrates a accelerated access record entry according to various embodiments;

FIG. 20C illustrates an updated range match accelerated access record table according to various embodiments.

The various embodiments mentioned above are described in further detail with reference to the aforementioned figured and the following detailed description of exemplary embodiments.

DETAILED DESCRIPTION

Certain embodiments disclosed herein provide methods and systems for secure storage, access, and transmission of electronic data. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
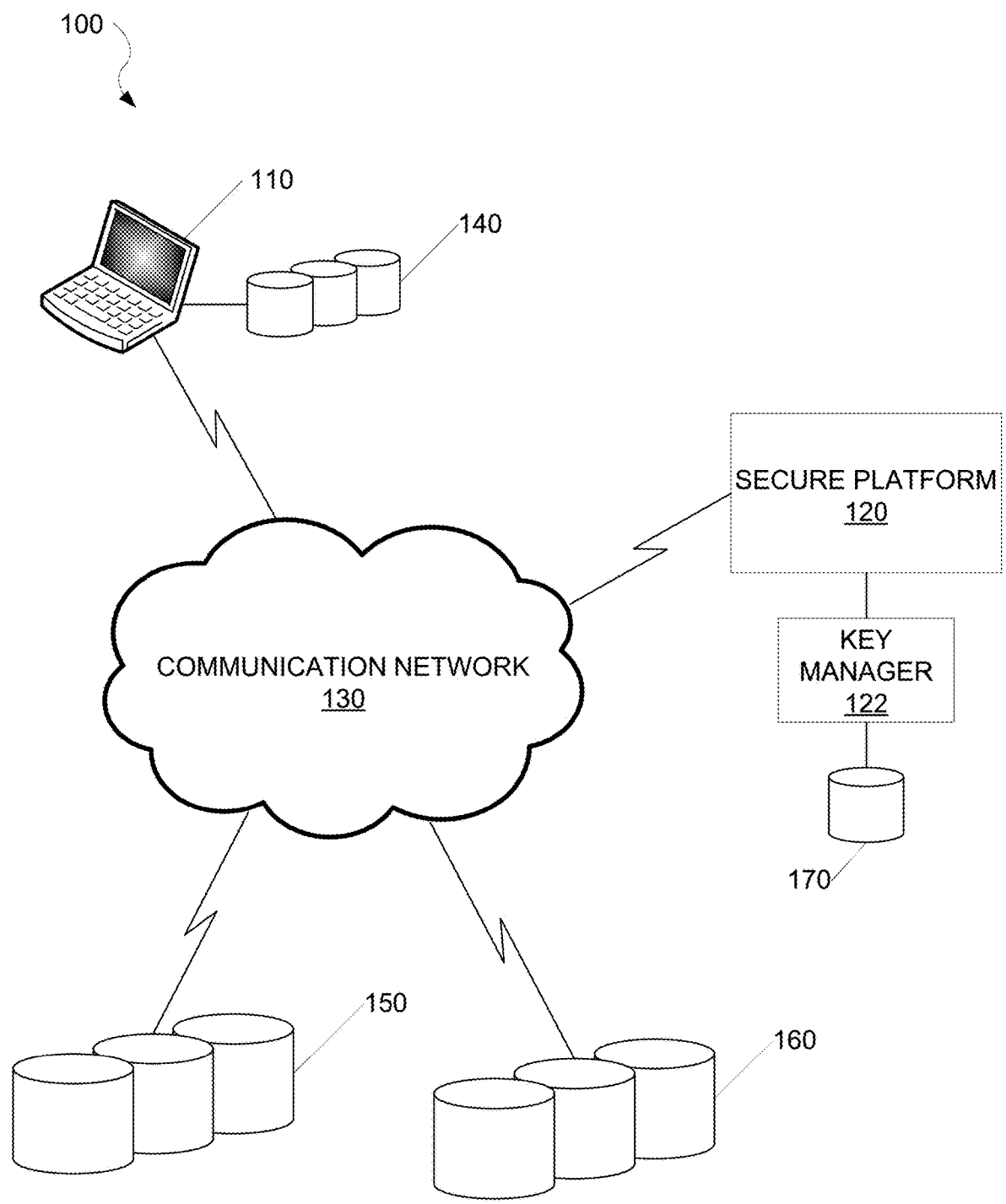
FIG. 1 is a network diagram illustrating a network environment according to various embodiments.

FIG. 1 is a network diagram illustrating a network environment 100 according to various embodiments. Referring to FIG. 1, a user device 110 communicates with a secure platform 120. The user device 110 may be any device that is capable of communication with or causing communication with the secure platform 120 through a wired or a wireless connection. For example, the user device 110 may be a wired or wireless communication device including, for example, but not limited to, a smartphone, a wearable device, a tablet personal computer (PC), a laptop, a desktop PC, a personal entertainment system, and an embedded processing system.

The user device 110 may communicate with the secure platform 120 via a communication network 130. In various embodiments, the communication network 130 represents one or more wired and/or wireless connections. For example, the communication network 130 may include, for example, but not limited to, a wired and/or wireless local area network (LAN), a wired and/or wireless wide area network (WAN), and any combinations thereof.

One or more features and functionalities of the secure platform 120 can be exposed via a user interface (UI). In one embodiment, one or more features and functionalities of the secure platform 120 may be accessed on the user device 110 via a mobile and/or web application. For example, during a secure session, the user device 110 may cause the secure platform 120 to store a data object, by inputting, selecting, or otherwise invoking a saveData( ) command through the UI provided via the user device 110. The user device 110 may also cause the secure platform 120 to retrieve the data object as well as any metadata that may be associated with the data object by inputting, selecting, or otherwise invoking a getData( ) command through the UI provided via the user device 110. It is to be understood that references to the data object throughout the present disclosure extends to any metadata that is associated with the data object. As such, any operation that is performed with respect to the data object (e.g., storing and retrieving the data object) is performed with respect to both the data object and any metadata associated with the data object.

According to one exemplary embodiment, to store the data object, the secure platform 120 applies a dissociative storage scheme that includes performance of one or more operations to eliminate logical nexus (e.g., between a user and the user's data object, portions of a data object, and portions of data objects stored at any one storage location) that may be exploited to gain unauthorized access to the data object in part and/or in whole. As will be described in further details, the secure platform 120 stores data objects in a manner that renders unauthorized access to any portion of an individual data object innocuous and inconsequential. In various embodiments, the dissociative storage scheme can isolate a security breach with respect to any portion of a data object to that portion of the data object alone thereby preventing any indirect security breaches with respect to other portions of the same data object, other data objects, and a storage location as a whole.

In various embodiments, the dissociative storage scheme includes decomposing the data object into a plurality of fragments. The secure platform 120 can further encrypt each fragment of the decomposed data object. According to one exemplary embodiment, each fragment of the decomposed data object is encrypted using a separate encryption key. In some embodiments, each fragment of the decomposed data object is encrypted with one encryption key in a series of cascading encryption keys.

The secure platform 120 further obfuscates an original record locator associated with each fragment of the decomposed data object. Advantageously, obfuscating the original record locator associated with each fragment of the decomposed data object eliminates logical nexus between the fragments of the decomposed data object. As such, the security of the data object as a whole is not compromised by unauthorized access to some fragments of the decomposed data object or metadata associated with the data object.

The secure platform 120 further distributes or "shards" each encrypted fragment of the decomposed data object along with a corresponding obfuscated record locator for storage across multiple storage locations including, for example, but not limited to, a first data store 140, a second data store 150, a third data store 160, a fourth data store 170. In one exemplary embodiment, the fragments of the decomposed data object may be distributed across multiple storage locations to eliminate any logical nexus between the fragments stored at any one data store. Moreover, sharding can also balance load across multiple storage locations thereby improving storage performance and reliability.

In some embodiments, the secure platform 120 may generate, encrypt, and store a data map that includes at least a portion of the information required to retrieve and reconstruct the decomposed data object (e.g., decomposition function, obfuscated record locators, encryption keys, and storage locations). Alternately or in addition, the secure platform 120 can perform one or more computations to dynamically derive (e.g., when retrieving the data object) at least a portion of the information required to retrieve and reconstruct the decomposed data object.

It is to be understood that the secure platform 120 may generate the data map as an optional feature to expedite retrieval of the data object. Thus, in some embodiments, the secure platform 120 may not generate a data map and may rely solely on computations to dynamically derive the information required to retrieve and reconstruct the decomposed data object. Alternately, in some embodiments, the secure platform 120 may generate a partial data map that is used in conjunction with information derived through one or more computations to retrieve and reconstruct the decomposed data object.

In one exemplary embodiment, at least some of the operations to store the data object (e.g., decomposition, obfuscation, encryption, and sharding) may be performed based on one or more variable storage parameters, including, for example, but not limited to, a user name and passphrase associated with the user, a current security model (e.g., obfuscation, encryption), a type of the data object (e.g., text, image), a size of the data object, performance requirements, and security requirements. According to one exemplary embodiment, the contents of the data map and an extent of computations that the secure platform 120 is required to perform in order to retrieve and reconstruct the data object may also be adjusted dynamically based on one or more variable storage parameters. In various embodiments, at least some of the storage parameters used to store the data object may be changed in response to one or more triggers including, for example, but not limited to, a detected security breach.

In some embodiments, the secure platform 120 can retrieve and reconstruct the decomposed data object based one or both of information included in the data map and information that is dynamically derived through one or more computations. For example, in some embodiments, the data map alone may provide adequate information (e.g., decomposition function, obfuscated record locators, encryption keys, and storage locations) for the secure platform 120 to retrieve and reconstruct the decomposed data object.

Alternately, in some embodiments, the secure platform 120 may not have generated and stored a data map for the data object, or the data map may include only a portion of the information required retrieve and reconstruct the data object. As such, in some embodiments, the secure platform 120 may perform one or more computations to dynamically derive at least a portion of the information required to retrieve and reconstruct the data object.

For example, in some embodiments, to retrieve the data object, the secure platform 120 may determine the decomposition function that was applied to decompose the data object. Alternately or in addition, the secure platform 120 may determine an obfuscated record locator, encryption key, and/or storage location associated with each fragment of the decomposed data object. As will be described in further details, based on the information included in the data map and/or dynamically derived through one or more computations, the secure platform 120 can retrieve and reconstruct the data object, which may have been decomposed, encrypted, and distributed to multiple storage locations for storage with a corresponding obfuscated record locator.

Additionally, in some embodiments, the secure platform 120 may perform one or more computations to dynamically derive at least a portion of the information required to generate a data map for retrieving a data object. For example, in some embodiments, the secure platform 120 may generate a data map or entries of a data map based, in part, on the data object. As will be described in further detail below, the data object may be stored using a decomposition function as described herein. The data map may be derived, in part, based on the decomposition function or identification of elements of the data object. For example, the secure platform 120 may store an image file and/or video file made up of a plurality of data objects contained in the image. Through image analysis and processing, the secure platform 120 may extract the data objects and associate them with a value and identifier. As will be described further below, the secure platform 120 may then calculate a record locator based on the data object and generate data map or a portion of a data map based on the data object.

In one example implementation, the secure platform 120 may encrypt and store a video file of a parking structure including various vehicles and license plates. The secure platform 120 may be configured to perform image processing techniques to identify data objects as license plates and extract a value for each license plate. The secure platform 120 may then calculate record locators for the data object associated with each license plate and generate a data map for retrieval of the entire video file and/or each individual license plate. As another example, the secure platform 120 may be encrypt and store surveillance footage and extract therefrom video portions of specific persons, features of persons, vehicles, or other portions of the video and generate entries in a data map based on the data objects.

In some embodiments, the data maps may be generated automatically in response to storing a data object (e.g., invoking a saveData( )command) or through a query to retrieve a data object that returns miss or no data entry present in the data map corresponding to the query. Alternatively, the data object may be previously stored, for example, using a decomposition function, and the data map may be generated based on a reverse decomposition function to retrieve individual values and data objects for generating data entries. While certain example processing algorithms have been described herein, it will be appreciated that the examples algorithms are not intended to be limiting. For example, any number of processing algorithms and/or plug-in modules may be used to extract objects. As used herein, a plug-in module may refer to a software component or module that may be added to an existing secure platform 120, thereby enabling customization and advancement in processing techniques within the scope of the disclosure herein. Example algorithms include, but are not limited to, machine learning, artificial intelligence, image processing techniques (e.g., machine vision, stitching, filtering, thresholding, pixel counting, segmentation, edge detection and tracking, color analysis, object recognition, pattern recognition, blob detection and extraction, optical character recognition, and the like), parsing of data objects and/or associated metadata, and the like. As document formats and algorithms evolve new ones are created, and new plug-in modules can be added to the secure platform 120 to support new file formats and seamlessly incorporate advancement into the data flow.

In one exemplary embodiment, the secure platform 120 can be configured to store the fragments of the decomposed data object at multiple storage locations that are local and/or remote to the user device 110. For example, the first data store 140 may be a local data store including, for example, but not limited to, an internal hard drive, a portal storage device (e.g., a universal serial bus (USB) flash drive, external hard drive), and any combination thereof. The second data store 150, the third data store 160, and the fourth data store 170 may be each be a remote data store including, for example, but not limited to, one or more databases (e.g., MongoDB®), cloud storage, and any combination thereof. The second data store 150, the third data store 160, and the fourth data store 170 can each be a proprietary data store (i.e., directly associated with the secure platform 120), or be associated with one or more third-party file hosting services (e.g., Amazon® Simple Storage Service (S3), Dropbox®) and/or storage as a service (STaaS) providers.

In various embodiments, the secure platform 120 requires a user passphrase from the user of the user device 110 in order to initiate a secure session and to store and retrieve data objects. Data objects are encrypted and decrypted using one or more encryption keys (e.g., a series of cascading encryption keys) that are generated based on the user passphrase. In some embodiments, the user passphrase may be managed by the user and provided by the user when initiating a secure session. Alternately, in some embodiments, the secure platform 120 may include a key manager 122 configured to generate and manage user credentials including, for example, but not limited to, user passphrases. In one exemplary embodiment, the key manager 122 applies a dissociative storage scheme to store the user passphrases. User passphrases can be decomposed into fragments. The individual fragments of the user passphrases are further encrypted and stored with an obfuscated record locator across multiple local and/or remote storage locations including, for example, but not limited to, the second data store 150, the third data store 160, and the fourth data store 170.

Storing a Data Object

Figure 2:
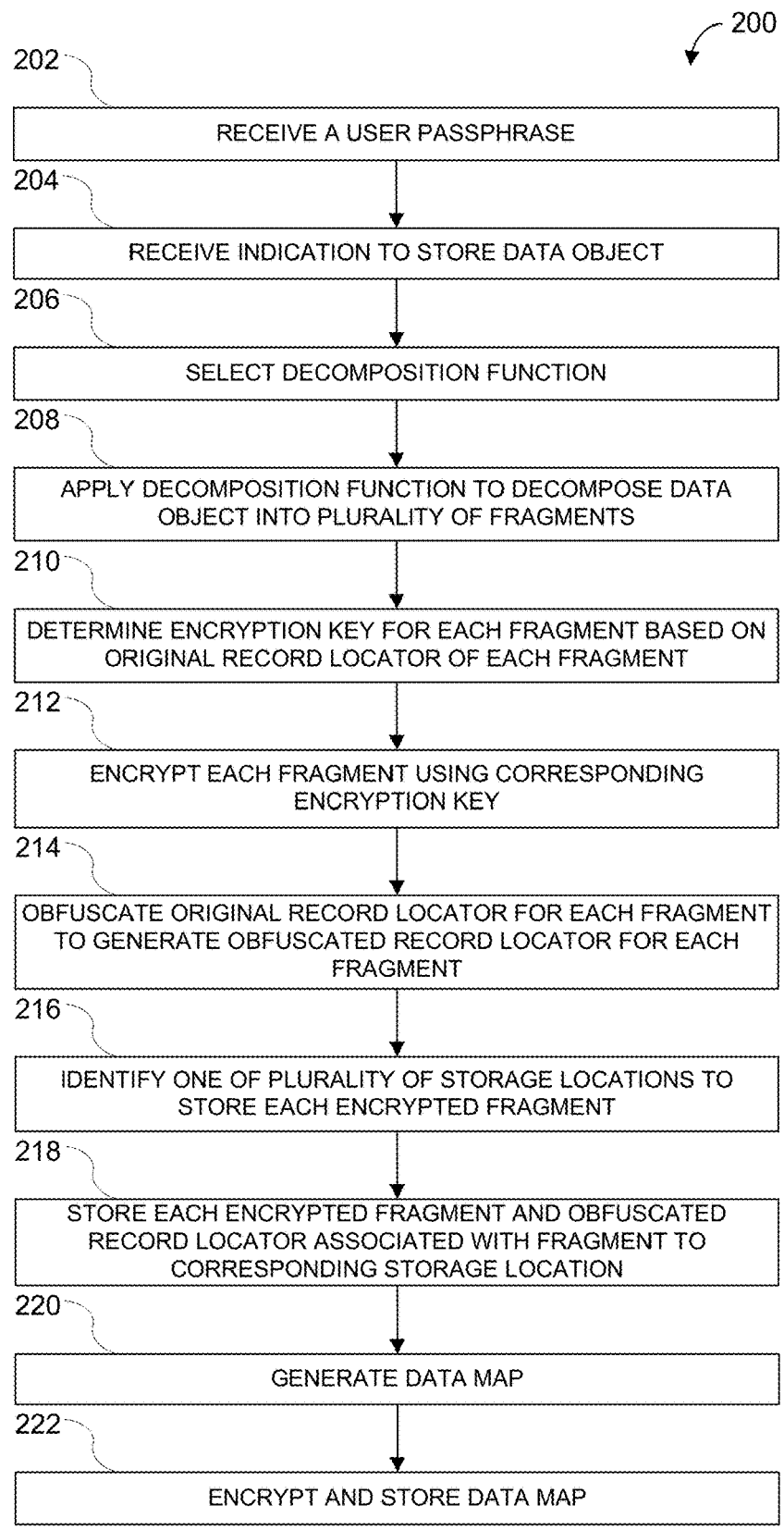
FIG. 2 is a flowchart illustrating a process for storing a data object according to various embodiments.

FIG. 2 is a flowchart illustrating a process 200 for storing a data object according to various embodiments. Referring to FIGS. 1-2, the process 200 can be performed by the secure platform 120.

The secure platform 120 receives a user passphrase (202). For example, in some embodiments, a user may input the user passphrase via the UI provided on the user device 110. Alternately, in other embodiments, the secure platform 120 may retrieve the user passphrase, which may have been generated and stored by the secure platform 120 (e.g., the key manager 122). As will be described in further details, the user passphrase may be a component of the multi-factor authentication (MFA) scheme imposed by the secure platform 120.

The secure platform 120 receives an indication to store a data object (204). For example, in various embodiments, the secure platform 120 may receive a saveData( )command input, selected, or otherwise invoked through the UI provided via the user device 110.

The secure platform 120 selects a decomposition function (206). In various embodiments, the secure platform 120 can select a decomposition function $D_i$ based on one or more variable storage parameters including, for example, but not limited to, a username, the user passphrase, a current security model, a type of the data object, a size of the data object, security requirements, and performance requirements.

For example, in some embodiments, $D_i$ may be one of a plurality of decomposition functions $D_1 \ldots D_n$. The secure platform 120 can combine (e.g., concatenate in a particular order) the variable storage parameters (e.g., username, user passphrase, current security model, data object type, and data object name) and apply a selection function (e.g., SHA-512) to the combination to generate a value for i.

According to one exemplary embodiment, the secure platform 120 can be configured to adaptively select the decomposition function $D_i$. Specifically, the decomposition function $D_i$ may be initially selected and subsequently changed in a dynamic fashion in order to decompose the data object in an optimal manner (e.g., number and/or size of fragments) for the size, type, performance requirements, and security requirements of the data object. In some embodiments, the secure platform 120 can select and change the decomposition function $D_i$ automatically based on a machine learning algorithm that varies the variable storage parameters based on factors including, for example, but not limited to, behavior pattern, context, and historical information.

For example, more compact data objects may be decomposed into relatively smaller fragments than a larger data object. Similarly, the ideal granularity of the decomposition function may also be directly proportional to the security requirements of the data object (i.e., more sensitive data objects are decomposed into smaller fragments). By contrast, the data object may be decomposed into larger number of fragments if a more stringent security model (e.g., encryption, obfuscation) is to be applied to each fragment and a smaller number of fragments if the data object is subject to a higher performance requirement. Thus, if the data object is a social security number, it may be ideal to decompose the data object into at least four separate fragments. Meanwhile, an image file (e.g., .JPEG, .BMP) may be ideally decomposed into 10 kilobyte (KB) sized fragments.

The secure platform 120 applies the decomposition function to decompose the data object into a plurality of fragments (208). In various embodiments, the secure platform 120 can apply $D_i$ to the data object to generate n fragments $f_1 \ldots f_n$. Each fragment $f_i$ of the decomposed data object may be associated with at least one original record locator $RL_i$. One or more original record locators $RL_i$ may be common to and shared amongst at least some of the n fragments of the decomposed data object. Alternately, one or more original record locators $RL_i$ may bear a discernable relationship (e.g., mathematical pattern) to each other. As such, the original record locators $RL_i$ may expose a logical nexus between $f_i$ and one or more other fragments of the decomposed data object.

The secure platform 120 determines an encryption key for each of the plurality of fragments of the decomposed data object based on an original record locator associated with each of the fragments (210). In various embodiments, the secure platform 120 calculates an encryption key $e_i$ for each fragment $f_i$ of the decomposed data object based at least in part on the corresponding original record locator $RL_i$. The secure platform 120 can calculate each $e_i$ based on one or more additional variable storage parameters including, for example, but not limited to, a username, the user passphrase, a current security model, a type of the data object, a size of the data object, security requirements, and performance requirements.

For example, in one exemplary embodiment, the secure platform 120 can combine (e.g., concatenate in a particular order) the original record locator and/or the variable storage parameters associated with each fragment $f_i$ (e.g., username, user passphrase, current security model, data object type, and data object name) and execute a function (e.g., SHA-512) on the combination to generate an encryption key $e_i$ for each $f_i$.

The secure platform 120 encrypts each of the plurality of fragments of the decomposed data object using a corresponding encryption key (212). For example, in various embodiments, the secure platform 120 may encrypt each fragment $f_i$ using a corresponding encryption key $e_i$ to generate an encrypted fragment $e_i f_i$.

As will be described in further details, according to one exemplary embodiment, each of the plurality of fragments of the decomposed data object is encrypted using one encryption key in a series of cascading encryption keys. As such, one fragment $f_i$ of the decomposed data object can be encrypted (i.e., using the corresponding encryption key $e_i$) along with the encryption key $e_{i+1}$ associated with another fragment $f_{i+1}$ of the decomposed data object. Alternately, in other embodiments, the fragment $f_i$ of the decomposed data object can be encrypted together with one or more of the parameters (e.g., original record locator $RL_i$) that are required to generate the encryption key $e_{i+1}$ associated with fragment $f_{i+1}$.

In one exemplary embodiment, the secure platform 120 can obfuscate each fragment $f_i$ of the decomposed data object prior to encrypting the fragment $f_i$. For example, in some embodiments, the secure platform 120 may obfuscate the fragment $f_i$ prior to encrypting the fragment $f_i$. As will be described in further details, the secure platform 120 can obfuscate each fragment $f_i$ based on one or more variable storage parameters including, for example, but not limited to, a username, the user passphrase, a current security model, a type of the data object, a name of the data object, and the encryption key $e_i$ associated with the fragment $f_i$.

The secure platform 120 obfuscates the original record locator for each of the plurality of fragments to generate an obfuscated record locator for each of the plurality of fragments (214). As will be described in further details, the secure platform 120 can alter and/or obfuscate an original record locator $RL_i$, for each fragment $f_i$ of the plurality of fragments $f_1 \ldots f_n$ to generate an obfuscated record locator $RL_i'$ based on one or more variable storage parameters including, for example, but not limited to, a username, the user passphrase, a current security model, a type of the data object, a size of the data object, security requirements, and performance requirements.

The secure platform 120 identifies one of a plurality of storage locations to store each encrypted fragment of the decomposed data object (216). In various embodiments, the secure platform 120 can identify a storage location $S_i$ (e.g., server and collection) for each encrypted fragment $e_i f_i$ of the decomposed data object based on based on one or more variable storage parameters including, for example, but not limited to, a username, the user passphrase, a current security model, a type of the data object, a name of the data object, the original record locator $RL_i$ associated with each fragment of the decomposed data object, security requirements, and performance requirements.

For example, in one exemplary embodiment, $S_i$ may be one of a plurality of storage locations $S_1 \ldots S_n$. The secure platform 120 can combine (e.g., concatenate in a particular order) the variable storage parameters (e.g., username, user passphrase, current security model, data object type, data object name, and original record locator) and apply a selection function (e.g., SHA-512) to the combination to generate a value for i.

The secure platform 120 stores each encrypted fragment of the decomposed data object and an obfuscated record locator associated with the fragment to a corresponding storage location (218). For example, in various embodiments, each encrypted fragment $e_i f_i$ of the decomposed data object and the obfuscated record locator $RL_i'$ associated with the encrypted fragment $e_i f_i$ is stored to a corresponding storage location $S_i$. In some embodiments, the secure platform 120 can store each encrypted fragment $e_i f_i$ and corresponding obfuscated record locator $RL_i'$ in the storage location $S_i$ at an address corresponding to the obfuscated record locator $RL_i'$.

The secure platform 120 generates a data map (220). In some embodiments, the secure platform can generate a data map that includes at least a portion of the information required to retrieve and reconstruct the data object. Advantageously, providing at least a portion of the information required to retrieve and reconstruct the data object in the data map may expedite subsequent retrieval and reconstruction of the data object. In one exemplary embodiment, the secure platform 120 may include all of the information required to retrieve and reconstruct the data object in a data map thereby obviating a need to perform any computations to dynamically derive any portion of the information when retrieving the data object. However, it is to be understood that the data map is an optional feature. As such, a person having ordinary skill in the art can appreciate that the secure platform 120 may (or may not) generate a data map without departing from the scope of the present inventive concept.

In various embodiments, the contents of the data map may be varied. For example, in some embodiments, the secure platform 120 can generate a data map that includes an order index (e.g., original data locators $RL_1 \ldots RL_n$) of the n fragments $f_1 \ldots f_n$ of the decomposed data object showing an original sequence or arrangement of the n fragments. Alternately or in addition, the data map may include one or more of an obfuscated record locator $RL_i'$, an encryption key $e_i$ and a storage location $S_i$ for each fragment $f_i$ of the decomposed data object. In various embodiments, the data map may also include additional attributes associated with the original data object including, for example, but not limited to, the user passphrase, a name of the data object, and one or more content integrity verifiers (e.g., a message digest (MD) signature).

The secure platform 120 encrypts and stores the data map (222). In various embodiments, the data map associated with the data object is encrypted and stored to a data store (e.g., on the first data store 140, the second data store 150, the third data store 160, and the fourth data store 170). The data map may be stored based at least in part on the name of the data object (e.g., "X-Ray 2015.09.15.pdf") and at a user specific location in the data store (e.g., on the first data store 140, the second data store 150, the third data store 160, and the fourth data store 170).

According to one exemplary embodiment, the secure platform 120 is able to support one or more data redundancy schemes (e.g., erasure coding). Thus, one or more operations of the process 200 may accommodate the inclusion of redundancy code in the data object and/or fragments of the data object. For example, in some embodiments, the secure platform 120 can inflate the data object (e.g., insert redundancy code) prior to decomposing the data object into n fragments $f_1 \ldots f_n$. Alternately or in addition, in some embodiments, the secure platform 120 can inflate each fragment $f_i$ (e.g., insert redundancy code) of the decomposed data object.

In various embodiments, applying one or more data redundancy schemes may generate additional fragments. For example, a data object that is decomposed into n fragments $f_1 \ldots f_n$ in the absence of a data redundancy scheme may be decomposed into n+x fragments as a result of applying one or more data redundancy schemes. As such, it is understood that the secure platform 120 can perform the process 200 to accommodate the additional fragments without departing from the scope of the present inventive concept.

For example, secure platform 120 can generate an encryption key for each of the additional x fragments and encrypt each additional fragment using a corresponding encryption key. The secure platform 120 can further obfuscate an original data locator associated with each of the additional x fragments and shard the additional x fragments for storage across multiple storage locations with a corresponding obfuscated record locator. In various embodiments, the secure platform 120 can generate a data map that includes at least a portion of the information required to retrieve and reconstruct the data object from the n+x fragments of the decomposed data object.

In one exemplary embodiment, at least some of the foregoing operations of the process 200 may be performed concurrently for each of the plurality of fragments of the decomposed data object. For example, the secure platform 120 may simultaneously obfuscate and/or encrypt each fragment $f_i$ of the n fragments of the decomposed data object as a plurality of concurrent processes. The secure platform 120 may further calculate an obfuscated record locator $RL_i'$ for each fragment $f_i$ of the n fragments of the decomposed data object as a plurality of concurrent processes.

Advantageously, the secure platform 120 is able to store the data object more securely (e.g., in multiple storage locations and in a dissociated state that is useless to bad actors) and in a significantly shorter amount of time compared to conventional storage schemes (e.g., sequential, unencrypted). For example, the secure platform 120 can perform the process 200 to store a 1 gigabyte (GB) data object (i.e., including decomposition, obfuscation, encryption, data map generation, and/or sharding) in less 11 seconds. In various embodiments, the secure platform 120 delivers superior data storage performance that is up to 8 times faster than conventional storage schemes.

A person having ordinary skill in the art can appreciate that one or more of the foregoing operations of the process 200 can be performed in a different order without departing from the scope of the present inventive concept. Moreover, in some embodiments, the process 200 may be performed without some of the foregoing operations without departing from the scope of the present inventive concept.

Retrieving a Data Object

Figure 3:
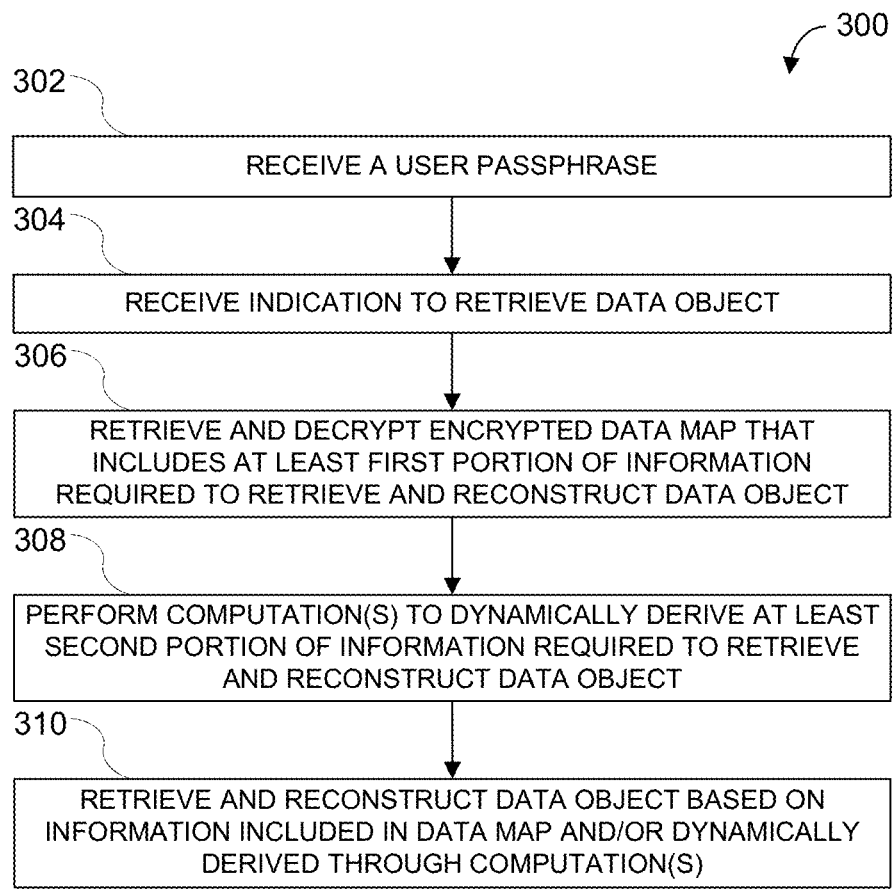
FIG. 3 is a flowchart illustrating a process for retrieving a data object according to various embodiments.

FIG. 3 is a flowchart illustrating a process 300 for retrieving a data object according to various embodiments. Referring to FIGS. 1 and 3, the process 300 can be performed by the secure platform 120.

The secure platform 120 receives a user passphrase (302). For example, in some embodiments, a user may input the user passphrase via the UI provided on the user device 110. Alternately, in other embodiments, the secure platform 120 may retrieve the user passphrase, which may have been generated and stored by the secure platform 120 (e.g., the key manager 122). As will be described in further details, the user passphrase may be a component of the MFA scheme imposed by the secure platform 120.

The secure platform 120 receives an indication to retrieve a data object (304). For example, in various embodiments, the secure platform 120 may receive a getData( ) command input, selected, or otherwise invoked through the UI provided via the user device 110. In various embodiments, to store the data object, the secure platform 120 may have decomposed the data object into a plurality of fragments $f_1 \ldots f_n$. The secure platform 120 may have further calculated an obfuscated record locator for each fragment $f_i$, encrypted each fragment $f_i$ using a corresponding encryption key $e_i$ and distributed the plurality of fragments $f_1 \ldots f_n$ for storage amongst multiple storage locations. As such, in order to retrieve the data object, the secure platform 120 obtains and/or computes information required to retrieve and reconstruct the data object including, for example, but not limited to, an order index of fragments $f_1 \ldots f_n$ (e.g., original record locators $RL_i \ldots RL_n$), an encryption key $e_i$ for each fragment $f_i$, an obfuscated record locator $RL_i'$ for each fragment $f_i$, and a storage location $S_i$ for each fragment $f_i$.

The secure platform 120 retrieves and decrypts an encrypted data map that includes at least a first portion of the information required to retrieve and reconstruct the data object (306). In some embodiments, when storing the data object, the secure platform 120 may have generated a data map that includes at least a portion of the information required to retrieve and reconstruct the data object. The secure platform 120 may have further encrypted and stored the data map based on a name of the data object (e.g., "X-Ray 2015.09.15.pdf") at a user-specific location in a data store (e.g., the first data store 140, the second data store 150, the third data store 160, and the fourth data store 170).

Advantageously, providing the data map as a source for at least a portion of the information required to retrieve and reconstruct the data object may expedite the retrieval and reconstruction of the data object from a plurality of fragments. In some embodiments, the data map may provide all of the information required to retrieve and reconstruct the data object thereby obviating a need to perform any computations to dynamically derive any portion of the information when retrieving the data object. However, it is to be understood that the data map is an optional feature. In some embodiments, the secure platform 120 may have generated a partial data map or the secure platform may not have generated a data map at all when storing the data object thereby requiring the secure platform 120 to dynamically derive some or all the information required to retrieve and reconstruct the data object.

For example, in various embodiments, the data map may include an order index of the original sequence or arrangement of the fragments $f_1 \ldots f_n$ (e.g., original record locators $RL_1 \ldots RL_n$). Alternately or in addition, the data map may include one or more of an encryption key $e_i$ (e.g., one in a series of cascading encryption keys), an obfuscated record locator $RL_i'$, and a storage location $S_i$ for each fragment $f_i$ of the decomposed data object. In various embodiments, the data map may further include additional attributes associated with the original data object including, for example, but not limited to, the user passphrase, a name of the data object, and one or more content integrity verifiers (e.g., an MD signature).

According to one exemplary embodiment, the contents of the data map may vary based on one or more variable storage parameters including, for example, but not limited to, a user passphrase, a current security model, a size of the data object, a type of the data object, security requirements, and performance requirements. Varying the contents of the data map can vary the extent of the computations that the secure platform 120 is required to perform in order to dynamically derive at least a portion of the information required to retrieve and reconstruct the data object. Providing more information in the data map will require the secure platform 120 to perform fewer computations to retrieve and reconstruct the data object, and may thereby expedite the retrieval of the data object.

In various embodiments, the secure platform 120 can retrieve the encrypted data map associated with the data object from a user specific location in a data store (e.g., the first data store 140, the second data store 150, the third data store 160, and the fourth data store 170) based at least in part on the name of the data object (e.g., "X-Ray 2015.09.15.pdf"). Moreover, the secure platform 120 decrypts the data map associated with the data object in order to access the information that is required to retrieve and reconstruct the data object.

The secure platform 120 performs one or more computations to dynamically derive at least a second portion of the information required to retrieve and reconstruct the data object (308). In various embodiments, the secure platform 120 may perform one or more computations to dynamically derive information required to retrieve and reconstruct the data object that is not provided by the data map. Providing less information in the data map will require the secure platform 120 to perform more extensive computations to retrieve and reconstruct the data object but may also increase the security of the data object.

For example, in various embodiments, the secure platform 120 may perform one or more computations to dynamically derive at least a portion of the information required to retrieve and reconstruct the data object including, for example, but not limited to, a decomposition function $D_i$, an encryption key $e_i$ (e.g., one in a series of cascading encryption keys) for each fragment $f_i$ of the decomposed data object, an obfuscated record locator $RL_i'$ for each fragment $f_i$, and a storage location $S_i$ for each fragment $f_i$.

For example, in the event that the data map does not provide an order index showing an original sequence or arrangement of the n fragments $f_1 \ldots f_n$ of the decomposed data object, the secure platform 120 can determine the decomposition function $D_i$ that was applied to decompose the data object based on one or more variable storage parameters including, for example, but not limited to, username, user passphrase, security model, type of the data object, size of the data object, security requirements, and performance requirements.

In one exemplary embodiment, $D_i$ may be one of a plurality of decomposition functions $D_1 \ldots D_n$. The secure platform 120 can combine (e.g., concatenate in a particular order) the variable storage parameters (e.g., username, user passphrase, current security model, data object type, data object size, security requirements, performance requirements) and apply a selection function (e.g., SHA-512) to the combination to determine the value for i.

The secure platform 120 applies the decomposition function $D_i$ to determine the original record locator $RL_i$ associated with each fragment $f_i$ of the decomposed data object. In some embodiments, the secure platform 120 can further calculate an obfuscated record locator $RL_i'$ for each fragment $f_i$ of the decomposed data object. As will be discussed in further details, the secure platform 120 can alter and/or obfuscate an original record locator $RL_i$ for each fragment $f_i$ of the plurality of fragments $f_1 \ldots f_n$ in to generate an obfuscated record locator $RL_i'$ based on one or more variable storage parameters including, for example, but not limited to, a username, the user passphrase, a current security model, a type of the data object, a size of the data object, security requirements, and performance requirements.

In some embodiments, if the data map does not provide an encryption key $e_i$ for each fragment $f_i$ of the decomposed data object, the secure platform 120 can calculate the encryption key $e_i$ that was used to generate each encrypted fragment $e_i f_i$ of the decomposed data object. In various embodiments, the secure platform 120 calculates each encryption key $e_i$ based at least in part on the corresponding original record locator $RL_i$ for each fragment $f_i$, which may be included in the data map or can be dynamically derived through one or more computations. The secure platform 120 may calculate each $e_i$ based on one or more additional variable storage parameters including, for example, but not limited to, a username, the user passphrase, a current security model, a type of the data object, a size of the data object, security requirements, and performance requirements. According to one exemplary embodiment, each encryption key $e_i$ used to encrypt a corresponding fragment $f_i$ is one encryption key in a series of cascading encryption keys.

For example, in some embodiments, the secure platform 120 can combine (e.g., concatenate in a particular order) the original record locator and/or the variable storage parameters associated with each fragment $f_i$ (e.g., username, user passphrase, current security model, data object type) and execute a function (e.g., SHA-512) on the combination to generate an encryption key $e_i$ that was used to encrypt each $f_i$.

In the event that the data map does not include the storage location $S_i$ for each fragment $f_i$ of the decomposed data object, the secure platform 120 can identify the storage location at which each encrypted fragment $f_i$ of the decomposed data object is stored. In various embodiments, fragments of the decomposed data object were distributed and stored in various storage locations including, for example, but not limited to, the first data store 140, the second data store 150, the third data store 160, and the fourth data store 170. The secure platform 120 can identify the storage location $S_i$ (e.g., server and collection) at which each encrypted fragment $e_i$ $f_i$, of the decomposed data object is stored based on one or more variable storage parameters including, for example, but not limited to, a username, the user passphrase, a current security model, a type of the data object, a size of the data object, security requirements, performance requirements, and the original record locator $RL_i$ associated with each fragment of the decomposed data object.

For example, in one exemplary embodiment, $S_i$ may be one of a plurality of storage locations $S_1 \ldots S_n$. The secure platform 120 can combine (e.g., concatenate in a particular order) the variable storage parameters (e.g., username, user passphrase, current security model, data object type, data object name, and original record locator) and apply a selection function (e.g., SHA-512) to the combination to generate a value for i.

The secure platform 120 retrieves and reconstructs the data object based on at least one of the information included in the data map and information that is dynamically derived through one or more computations (310). In various embodiments, the information that is required to retrieve and reconstruct the data object includes, for example, but not limited to, an order index of the fragments $f_1 \ldots f_n$ (e.g., original record locators $RL_1 \ldots RL_n$), an obfuscated record locator $RL_i'$ for each fragment $f_i$, an encryption key $e_i$ for each fragment $f_i$, and a storage location $S_i$ for each fragment $f_i$.

For example, based on the information provided by the data map and/or dynamically derived through one or more calculations, the secure platform 120 can retrieve each fragment $f_i$ from a storage location $S_i$ at which the fragment is $f_i$ stored. The secure platform 120 can further decrypt each fragment $f_i$ using the corresponding encryption key $e_i$ and reconstruct the original data object from the fragments $f_1 \ldots f_n$.

In one exemplary embodiment, at least some of the foregoing operations of the process 300 may be performed concurrently for each of the plurality of fragments of the decomposed data object. For example, the secure platform 120 may simultaneously decrypt each encrypted fragment $e_i f_i$ of the decomposed data object as a plurality of concurrent processes. The secure platform 120 may further calculate an obfuscated record locator $RL_i'$ for each fragment $f_i$ of the n fragments of the decomposed data object as a plurality of concurrent processes.

Advantageously, the secure platform 120 is able to retrieve the data object, which has been stored in a more secure fashion (e.g., in multiple storage locations and in a dissociated state that is useless to bad actors), in a significantly shorter amount of time than if the same data object had been stored according to a conventional storage scheme (e.g., sequential, unencrypted). For example, the secure platform 120 can perform the process 300 to retrieve a 1 GB data object (i.e., based on information included in a data map and/or dynamically derived through one or more computations) in less 11 seconds. In various embodiments, the secure platform 120 delivers superior data retrieval performance that is up to 8 times faster than conventional storage schemes.

A person having ordinary skill in the art can appreciate that one or more of the foregoing operations of the process 300 can be performed in a different order without departing from the scope of the present inventive concept. Moreover, in some embodiments, the process 300 may be performed without some of the foregoing operations without departing from the scope of the present inventive concept.

Record Locator Obfuscation

In various embodiments, the secure platform 120 obfuscates the original record locator associated with each fragment of the decomposed data object in order to eliminate logical nexus between the fragments of the decomposed data object, which may be stored separately in multiple data stores. Each fragment $f_i$ of the decomposed data object may be associated with at least one original record locator $RL_i$ that is common to and shared amongst at least some of the n fragments and/or subsets of the n fragments of the decomposed data object. As such, the original record locator $RL_i$ of the fragment $f_i$ may expose a logical nexus between $f_i$ and one or more other fragments of the decomposed data object.

Figure 4A:
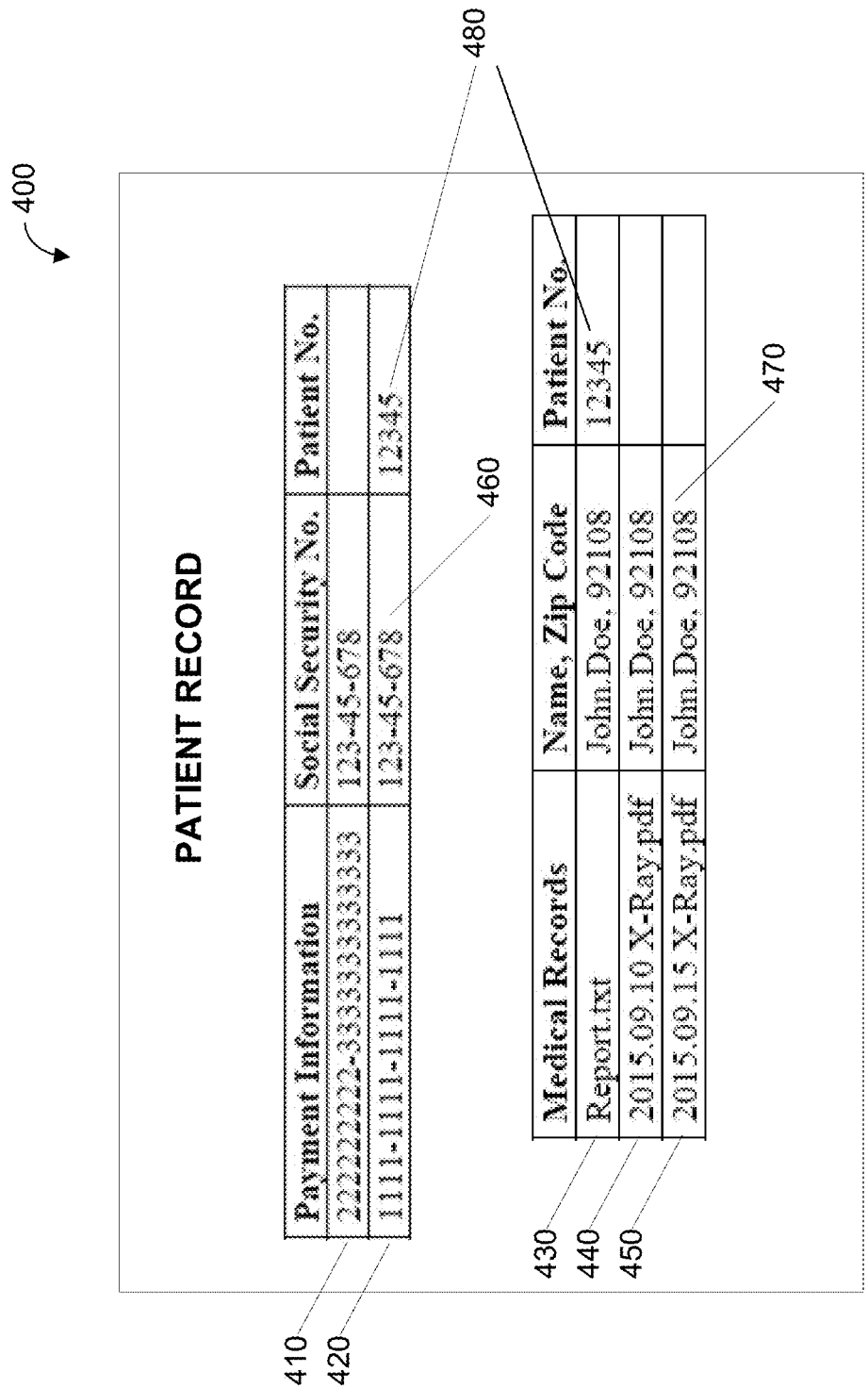
FIG. 4A illustrates a data object stored according to a conventional relational storage scheme.

FIG. 4A illustrates a data object 400 stored according to a conventional relational storage scheme. For example, the data object 400 may be a patient profile that includes be various records (e.g., payment, medical) associated with a user.

Referring to FIG. 4A, the data object 400 may be include a plurality of fragments including, for example, but not limited to, a first fragment 410, a second fragment 420, a third fragment 430, a fourth fragment 440, and a fifth fragment 450.

The first fragment 410 and the second fragment 420 may both be associated with a common first record locator 460. As such, the first record locator 460 exposes a logical nexus between the first fragment 410 and the second fragment 420. For example, the first fragment 410 and the second fragment 420 may both be the user's payment information or portions of the user's payment information (e.g., credit card number, bank account number) while the first record locator 460 may be the user's social security number.

The third fragment 430, the fourth fragment 440, and the fifth fragment 450 may all be associated with a common second record locator 470. As such, the second record locator 470 may expose a logical nexus between the third fragment 430, the fourth fragment 440, and the fifth fragment 450. For example, the third fragment 430, the fourth fragment 440, and the fifth fragment 450 may be records or portions of records containing the user's medical history (e.g., x-rays, diagnostic reports). The second record locator 470 may be a combination of the user's name and zip code.

Both the second fragment 420 and the third fragment 430 may further be associated with a common third record locator 480. As such, the third record locator 480 may expose a logical nexus between the second fragment 420 and the third fragment 430. Moreover, by linking the second fragment 420 and the third fragment 430, the third record locator 480 may also indirectly expose a logical nexus between the all of the first fragment 410, the second fragment 420, the third fragment 430, the fourth fragment 440, and the fifth fragment 450. For example, the third record locator 480 may be the user's patient identification number that is associated with at least one of the user's payment information (e.g., the second fragment 420) and at least one of the user's medical records (e.g., the third fragment 430).

According to one exemplary embodiment, the secure platform 120 obfuscates an original record locator that is common to and shared by more than one fragment of a decomposed data object. Obfuscating the original record locator generates an obfuscated record locator that is unique for each corresponding fragment of the decomposed data object. Advantageously, the unique obfuscated record locator will not reveal any logical nexus that may exist between various fragments of the decomposed data object. Moreover, the secure platform 120 applies a one-way function to generate the unique obfuscated record locators from the corresponding original record locator. As a result, the original record locator cannot be reversed computed based on the unique obfuscated record locators generated for each fragment of the decomposed data object.

Figure 4B:
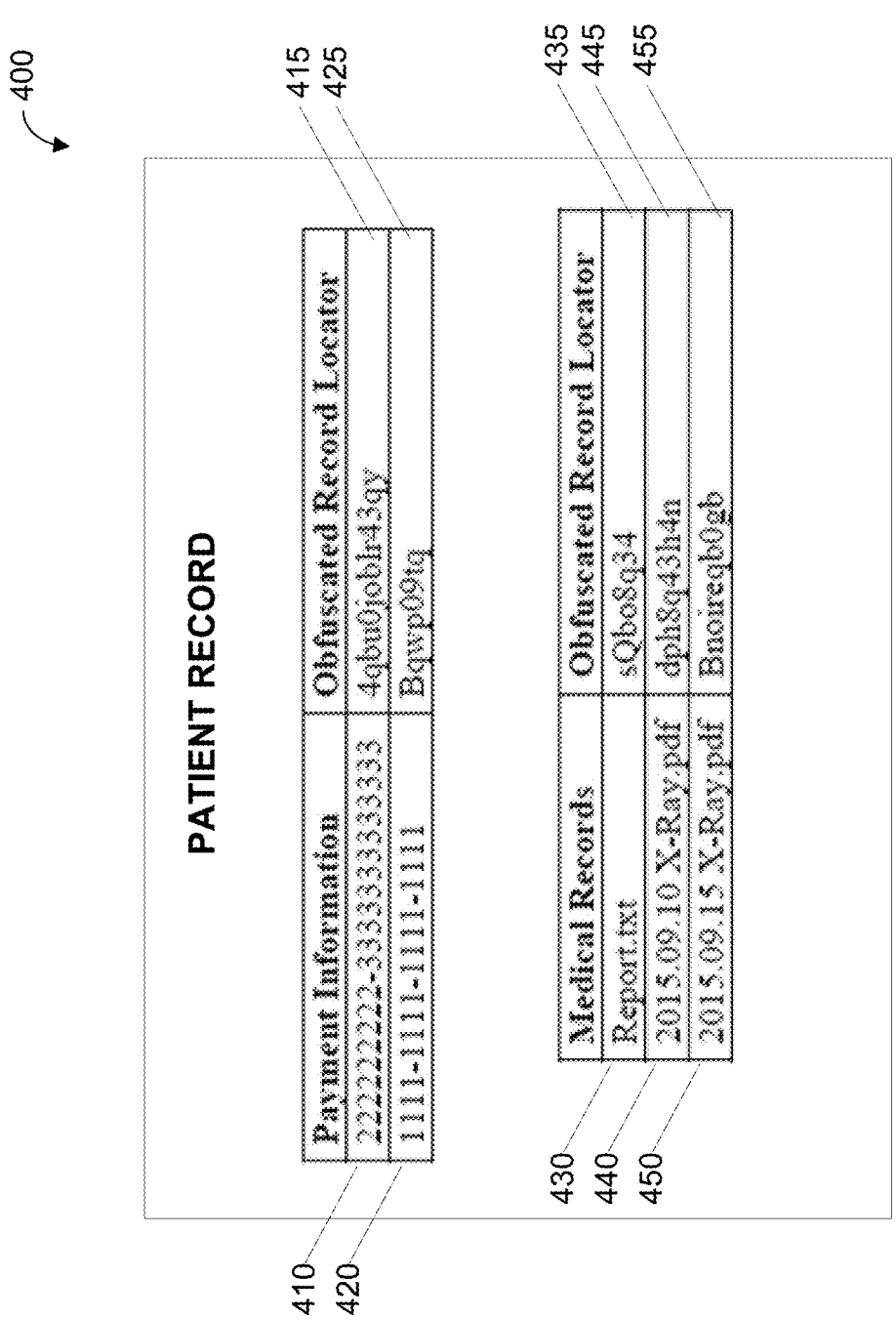
FIG. 4B illustrates the data object stored with obfuscated record locators according to various embodiments.

FIG. 4B illustrates the data object 400 stored with obfuscated record locators according to various embodiments. Referring to FIGS. 4A-B, one or more original record locators (e.g., the first record locator 460, the second record locator 470, and the third record locator 480) have been obfuscated to generate unique obfuscated record locators for each of the first fragment 410, the second fragment 420, the third fragment 430, the fourth fragment 440, and the fifth fragment 450.

For example, as shown in FIG. 4B, the first fragment 410 is associated with a first obfuscated record locator 415 and the second fragment 420 is associated with a second obfuscated record locator 425. The first obfuscated record locator 415 and the second obfuscated record locator 425 are unique and do not reveal any logical nexus between the first fragment 410 and the second fragment 420, which may both financial records or portions of financial records (e.g., credit card number) included in a user's patient profile.

The third fragment 430, the fourth fragment 440, and the fifth fragment 450 are also each associated with a unique obfuscated record locator. For example, the third fragment 430 is associated with a third obfuscated record locator 435, the fourth fragment 440 is associated with a fourth obfuscated record locator 445, and the fifth fragment 450 is associated with a fifth obfuscated record locator 455. The third obfuscated record locator 435, the fourth obfuscated record locator 445, and the fifth obfuscated record locator 455 do not reveal any logical nexus between the corresponding third fragment 430, the fourth fragment 440, and the fifth fragment 450, which may all be medical records or portions of medical records (e.g., diagnostic history) included in the user's patient profile.

Moreover, the second fragment 420 and the third fragment 430 are each associated with a unique obfuscated record locator (e.g., the second obfuscated record locator 425 and the third obfuscated record locator 435 respectively) and not a common record locator (e.g., the third record locator 480) as in the conventional relational storage scheme shown in FIG. 4A. The second obfuscated record locator 425 and the third obfuscated record locator 435 do not reveal any logical nexus between the second fragment 420 and the third fragment 430. The second obfuscated record locator 425 and the third obfuscated record locator 435 further do not indirectly reveal any logical nexus between all of the fragments of the data object 400, which may be financial and medical records included in the same patient profile. By contrast, under the conventional relational storage scheme shown in FIG. 4A, all the financial and medical record portions of the user's patient profile may be linked, both directly and indirectly, via the common third record locator 480 (e.g., patient identification number).

Figure 5:
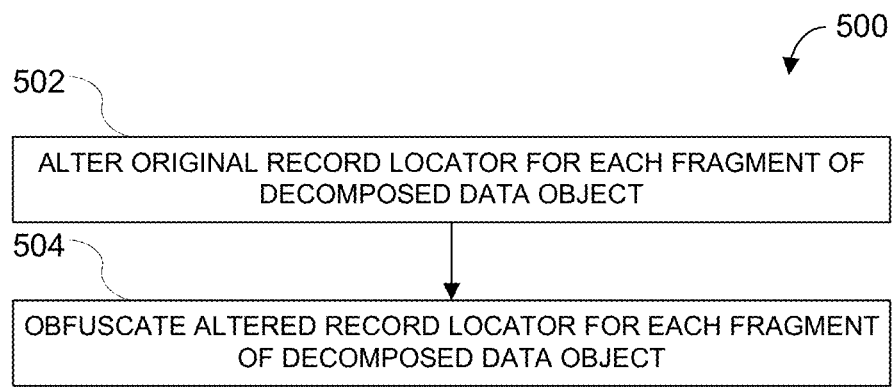
FIG. 5 is a flowchart illustrating a process for calculating an obfuscated data locator according to various embodiments.

FIG. 5 is a flowchart illustrating a process 500 for calculating an obfuscated data locator according to various embodiments. Referring to FIGS. 1, 2 and 5, the process 500 may be performed by the secure platform 120 and may implement operation 218 of the process 200.

The secure platform 120 may alter an original record locator for each fragment of the decomposed data object (502). For example, in various embodiments, the secure platform 120 may alter the original record locator $RL_i$ corresponding to a fragment $f_i$ of a decomposed data object based on one or more variable storage parameters including, for example, but not limited to, the username, the user passphrase, the current security model, a type of the data object, a size of the data object, security requirements, and performance requirements.

The secure platform 120 may obfuscate the altered record locator for each fragment of the decomposed data object (504). In one exemplary embodiment, the secure platform 120 may obfuscate the altered original record locator $RL_i$ by applying a one-way obfuscation function including, for example, but not limited to, a hashing function (e.g., SHA-256). The secure platform 120 can generate and/or vary the input of the one-way function (e.g., SHA-256) based on one or more variable storage parameters including, for example, but not limited to, the username, the user passphrase, current security model, data object name, and data object type. In various embodiments, the one or more variable storage parameters may include additional parameters that can be varied to enhance pseudo-random nature of the output from the one-way obfuscation function.

For example, the secure platform 120 may combine (e.g., concatenate in a certain order) the one or more variable storage parameters and execute a hashing function (e.g., SHA-512) on the combination to generate at least one input to the one-way obfuscation function. The secure platform 120 may further vary additional inputs to the one-way obfuscation function including, for example, but not limited to, a salt iteration and a salt position.

A person having ordinary skill in the art can appreciate that the foregoing operations of the process 500 may be performed in a different order without departing from the scope of the present inventive concept. Moreover, the process 500 may be performed without some of the foregoing operations (e.g., altering the original record locator) without departing from the scope of the present inventive concept.

Obfuscation of Data Object Fragments

In some embodiments, the secure platform 120 can obfuscate each fragment of the decomposed data object in addition to encrypting the fragments. For example, in some embodiments, each fragment $f_i$ of the decomposed data object may be obfuscated prior to encryption.

A logical nexus between each fragment $f_i$ of the decomposed data object and a corresponding record locator may be revealed based on the value of the fragment. Thus, obfuscating the fragments of the decomposed data object can obscure any discernable logical nexus between each fragment and a corresponding record locator.

Figure 6A:
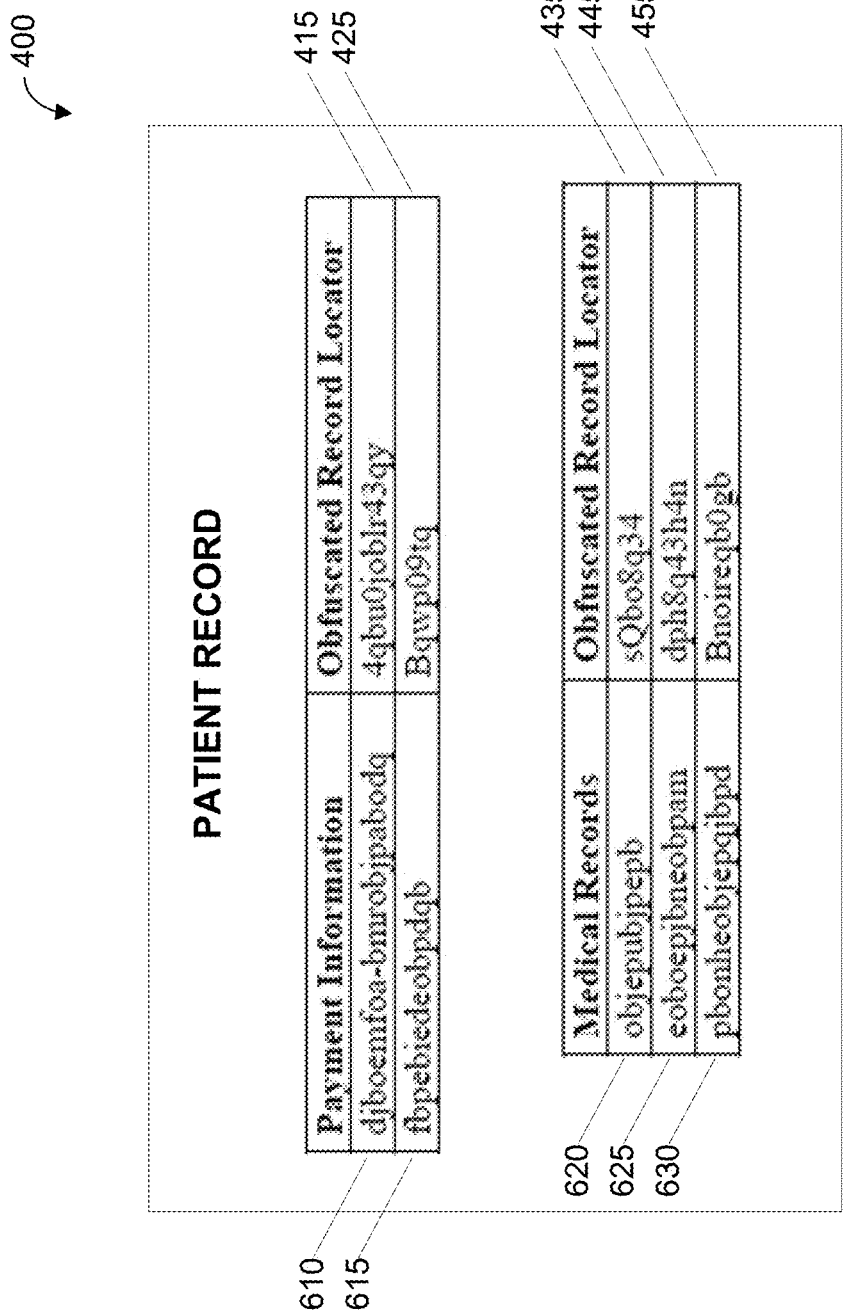
FIG. 6A illustrates a data object stored with encrypted fragments according to various embodiments.

FIG. 6A illustrates the data object 400 stored with encrypted fragments according to various embodiments. Referring to FIGS. 4A-B and 6A, the one or more original record locators (e.g., the first record locator 460, the second record locator 470, and the third record locator 480) are obfuscated to generate a unique record locator for each of the fragments of the data object 400. As such, the first fragment 410 is associated with the first obfuscated record locator 415, the second fragment 420 is associated with the second obfuscated record locator 425, the third fragment 430 is associated with the third obfuscated record locator 435, the fourth fragment 440 is associated with the fourth obfuscated record locator 445, and the fifth fragment 450 is obfuscated with the fifth obfuscated record locator 455.

In some embodiments, each fragments of the data object 400 (e.g., the first fragment 410, the second fragment 420, the third fragment 430, the fourth fragment 440, and the fifth fragment 450) can be encrypted and stored with a corresponding obfuscated record locator. As such, the first fragment 410 encrypted to generate a first encrypted fragment 610. The first encrypted fragment 610 is associated and stored with the first obfuscated record locator 415. The second fragment 420 is encrypted to generate a second encrypted fragment 615, which is associated and stored with the second obfuscated record locator 425. The third fragment 430 is encrypted to generate a third encrypted fragment 620. The third encrypted fragment 620 is associated and stored with the third obfuscated record locator 435. The fourth fragment 440 is encrypted to generate a fourth encrypted fragment 625. The fourth encrypted fragment 625 is associated and stored with the fourth obfuscated record locator 445. The fifth fragment 450 is encrypted to generate a fifth encrypted fragment 630, which is associated and stored with the fifth obfuscated record locator 455.

Figure 6B:
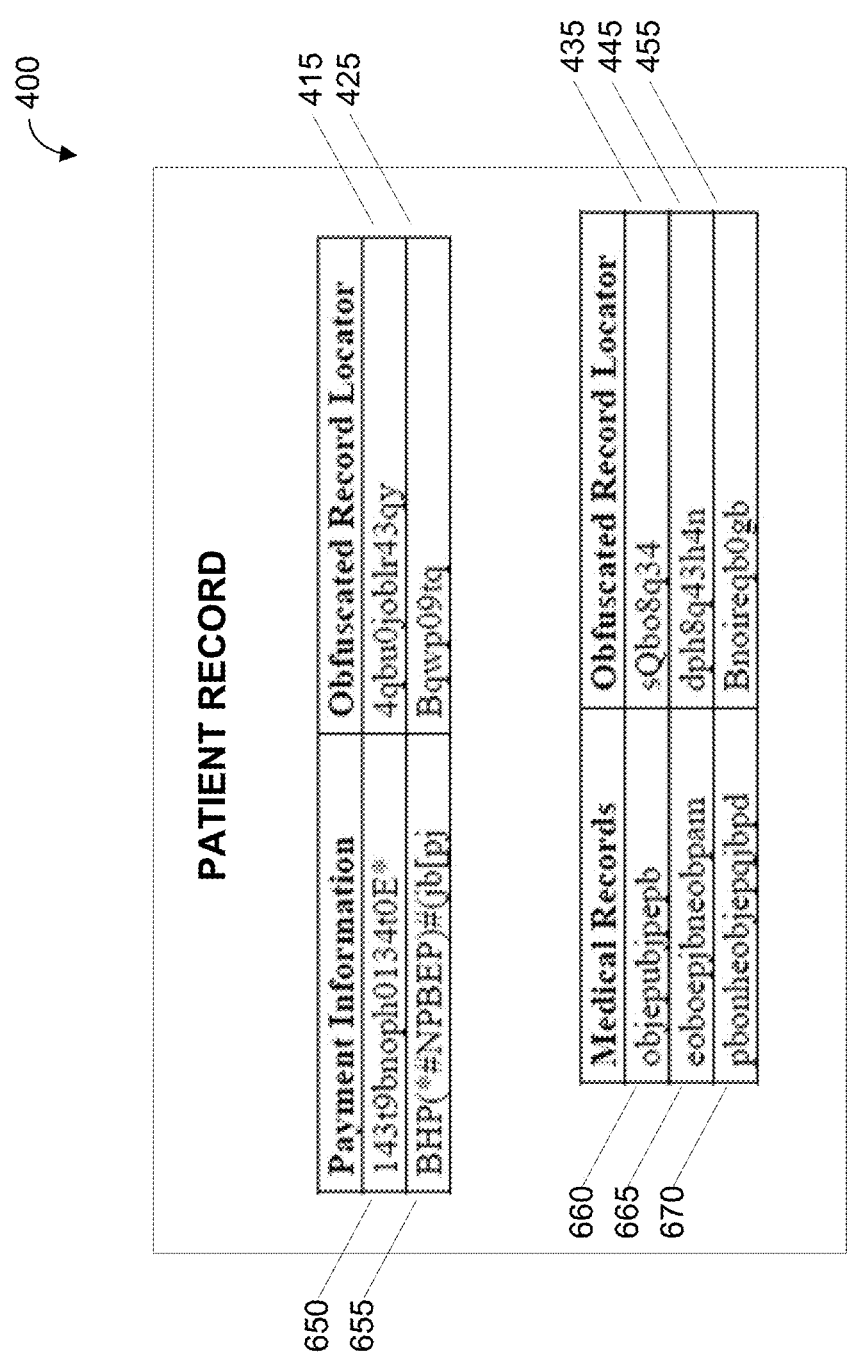
FIG. 6B illustrates a data object stored with encrypted and obfuscated fragments according to various embodiments.

FIG. 6B illustrates the data object 400 stored with encrypted and obfuscated fragments according to various embodiments. Referring to FIGS. 4A-B and 6A-B, the one or more original record locators (e.g., the first record locator 460, the second record locator 470, and the third record locator 480) are obfuscated to generate a unique record locator for each of the fragments of the data object 400. Each fragment of the data object 400 is obfuscated in addition to being encrypted. The encrypted and obfuscated fragments are associated and stored with a corresponding obfuscated record locator.

For example, the secure platform 120 may encrypt and obfuscate each of the fragments of the data object (e.g., the first fragment 410, the second fragment 420, the third fragment 430, the fourth fragment 440, and the fifth fragment 450) to generate a first encrypted and obfuscated (EO) fragment 650, a second EO fragment 655, a third EO fragment 660, a fourth EO fragment 665, and a fifth EO fragment 670. Each of the first EO fragment 650, the second EO fragment 655, the third EO fragment 660, the fourth EO fragment 665, and the fifth EO fragment 670 can be associated and stored with a corresponding obfuscated record locator.

Cascading Encryption Keys

In one exemplary embodiment, the secure platform 120 encrypts each of the plurality of fragments of the decomposed data object using one encryption key in a series of cascading encryption keys. As such, one fragment $f_i$ of the decomposed data object can be encrypted (i.e., using the corresponding encryption key $e_i$) along with the encryption key $e_{i+1}$ associated with another fragment $f_{i+1}$ of the decomposed data object. Alternately, in other embodiments, the fragment $f_i$ of the decomposed data object can be encrypted together with one or more of the parameters that are required to generate the encryption key $e_{i+1}$ associated with fragment $f_{i+1}$.

Figure 7:
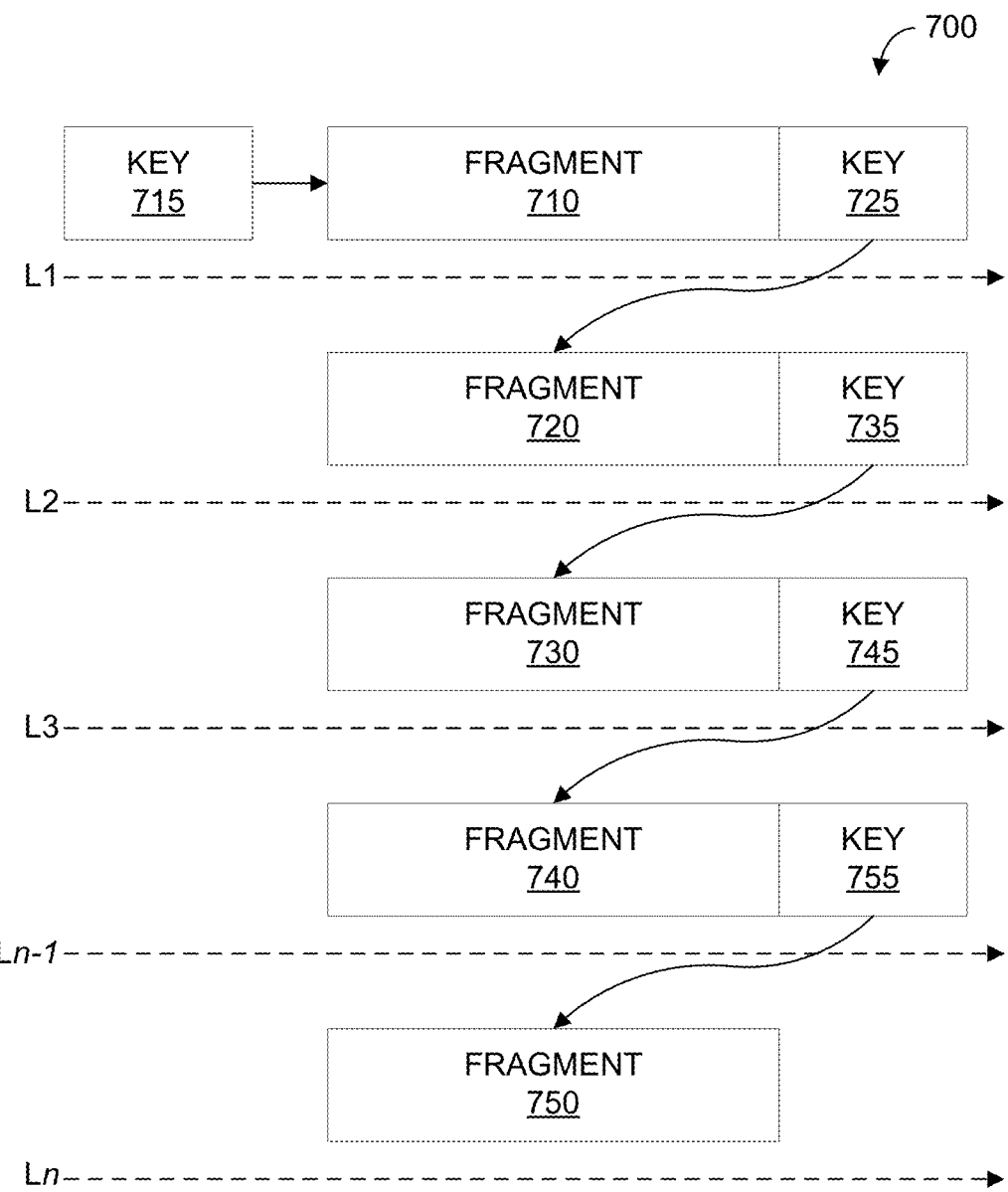
FIG. 7 illustrates fragments of a data object encrypted using cascading encryption keys according to various embodiments.

FIG. 7 illustrates fragments of a data object 700 encrypted using cascading encryption keys according to various embodiments. Referring to FIG. 7, the data object 700 may include a plurality of fragments including, for example, but not limited to, a first fragment 710, a second fragment 720, a third fragment 730, a fourth fragment 740, and an n-th fragment 750.

The secure platform 120 encrypts the first fragment 710 using a first encryption key 715. According to one exemplary embodiment, encrypting the first fragment 710 using the first encryption key 715 includes encrypting a second encryption key 725 used to encrypt the second fragment 720 along with the first fragment 710. Alternately, the secure platform 120 may use the first encryption key 715 to encrypt the first fragment 710 along with at least one parameter required to generate second encryption key 725. For example, the secure platform 120 may encrypt the first fragment 710 along with an original record locator of the second fragment 720.

Similarly, the secure platform 120 encrypts the second fragment 720 using the second encryption key 725 along with a third encryption key 735 or at least one parameter required to generate the third encryption key 735. The third encryption key 735 is used to encrypt the fourth fragment 740 along with an n-1 encryption key 755 or at least one parameter required to generate the n-1 encryption key 755. The secure platform 120 encrypts the n-th fragment 750 of the data object 700 using the n-1 encryption key 755.

In various embodiments, access to the data object 700 is provided in sequential "layers." The first encryption key 715 may be a "parent" key that is required to gain access to (e.g., decrypt) fragments residing at a first data layer $L_1$ as well as all subsequent data layers (e.g., a second data layer $L_2$, a third data layer $L_3$, an n-1 data layer $L_{n-1}$, and an n-th data layer $L_n$).

Specifically, the first encryption key 715 is required to gain access to (e.g., decrypt) the first fragment 710, which resides at $L_1$. Additionally, successfully unlocking the first data layer using the first encryption key 715 also provides access to the second encryption key 725. For example, the first encryption key 715 may unlock the second encryption key 725 or unlock parameters required to generate the second encryption key 725. Thus, $L_1$ must be successfully unlocked (e.g., using the first encryption key 715) prior to gaining access to the second fragment 720 residing at $L_2$.

In various embodiments, a user is required to know and/or maintain some but not all of the encryption keys in the series of cascading encryption keys. For example, the user is required to know and/maintain only the parent key (e.g., the first encryption key 715). Alternately, the parent key may be maintained by the secure platform (e.g., the key manager 122). The remaining keys (e.g., the second encryption key 725, the third encryption key 735, and the n-1 encryption key) are generated and maintained by the secure platform 120, and therefore remains transparent to the user.

In various embodiments, the secure platform 120 can automatically regenerate encryption keys used to secure some but not all data layers in response to a security breach that is localized to some but not all data layers. For example, the secure platform 120 may detect a security breach at one data layer $L_i$ (e.g., an anomalous attempt to access a fragment $f_i$ of the data object 700 residing at $L_i$). The fragment $f_i$ of the data object 700 and an encryption key $e_{i+1}$ can both reside at data layer $L_i$. Moreover, the encryption key $e_{i+1}$ is used to encrypt a fragment $f_{i+1}$ of the data object 700 as well as an encryption key $e_{i+2}$. As such, in response to detecting the security breach, the secure platform 120 can automatically change the encryption key $e_{i+1}$. The secure platform 120 can further re-encrypt both the fragment $f_{i+1}$ of the data object 700 and the encryption key $e_{i+2}$ using a new encryption key $e_{i+1}'$.

In various embodiments, the secure platform 120 generate each encryption key in the series of cascading encryption keys based at least in part on an original record locator of a corresponding fragment of the data object 700. For example, the first encryption key 715 is generated based at least in part on an original record locator of the first fragment 710. In some embodiments, the secure platform 120 may calculate each encryption key based on one or more additional variable storage parameters including, for example, but not limited to, a username, the user passphrase, a current security model, a type of the data object 700, and a name of the data object 700.

FIG. 8 illustrates a series of cascading encryption keys 800 according to various embodiments. Referring to FIG. 8, the series of cascading encryption keys 800 includes a plurality of encryption keys including, for example, but not limited to, a first encryption key 810, a second encryption key 815, a third encryption key 820, a fourth encryption key 825, and a fifth encryption key 830.

In some embodiment, each data layer may be secured by a single encryption key. As such, the first encryption key 810 is the only encryption key required to provide access to the second encryption key 815 residing in a first data layer $L_1$. For example, the second encryption key 815 or parameters required to generate the second encryption key 815 may be accessed by unlocking $L_1$ using only the first encryption key 810. Similarly, the second encryption key 815 is the only encryption key required to unlock a second data layer $L_2$ and gain access to the third encryption key 820. The third encryption key 820 is the only encryption key required to provide access to the fourth encryption key 825 by unlocking a third data layer $L_3$. The fourth encryption key 825 is the only encryption key required to unlock a fourth data layer $L_4$ and gain access to the fifth encryption key 830.

FIG. 9 illustrates a series of cascading encryption keys 900 according to various embodiments. Referring to FIG. 9, the series of cascading encryption keys 900 includes a plurality of encryption keys including, for example, but not limited to, the first encryption key 910, the second encryption key 915, the third encryption key 920, the fourth encryption key 925, the fifth encryption key 930, and a secondary key 965.

In some embodiments, at least one data layer may be unlocked using a composite encryption key, which includes more than one encryption key. For example, while only a single encryption key is required to gain access to the second encryption key 915 residing at a first data layer $L_1$, the third encryption key 920 residing at a second data layer $L_2$, and the fifth encryption key 930 residing at a fourth data layer $L_4$, a composite key 960 that includes both the third encryption key 920 and the secondary key 965 is required to provide access to the fourth encryption key 925 residing at a third data layer $L_2$.

In some embodiments, a requirement for multi-party authorization can be imposed using the composite key 960. For example, the secondary key 965 of the composite key 960 can be used to block access to one or more data layers in the event of an emergency (e.g., security breach). While the secure platform 120 may automatically provide the secondary key 965 under normal circumstances, the secure platform 120 can suppress the secondary key 965 during an emergency (e.g., security breach). As a result, access to the data layer secured by the composite key 960 (e.g., $L_3$) and all subsequent data layers (e.g., $L_4$) may be blocked.

Additionally, in some embodiments, the composite key 960 can be configured to provide a "stop limit key" feature. For example, in a data layer that is secured using only a single encryption key (e.g., $L_1$, $L_2$, and $L_4$), access to that data layer and all subsequent data layers is blocked in the event of a failure to correctly provide the encryption key for that data layer. By contrast, if the composite key 960 is configured to provide the "stop limit key" feature, then only access to the data layer that is secured by the composite key 960 (e.g., $L_3$) is blocked in the event of a failure to correctly provide one of the encryption keys included in the composite key 960 (e.g., the third encryption key 920 or the secondary key 965).

Multi-Factor Authentication

In various embodiments, the secure platform 120 imposes an MFA scheme to verify the identity of the originally registered user. As such, according to one exemplary embodiment, the secure platform 120 controls access based on a combination of username, user passphrase, and access code.

In various embodiments, in addition to providing a username and user passphrase, user registration includes registration of a "factored device." A factored device may be any device capable of wired or wireless communication including, for example, but not limited to, a mobile communication device (e.g., smartphone).

The secure platform 120 transmits one or more access codes to the factored device. A user attempting to access the secure platform 120 (e.g., to store and/or retrieve data objects) is authenticated based on the username, user passphrase, and at least one access code from the factored device.

Figure 10:
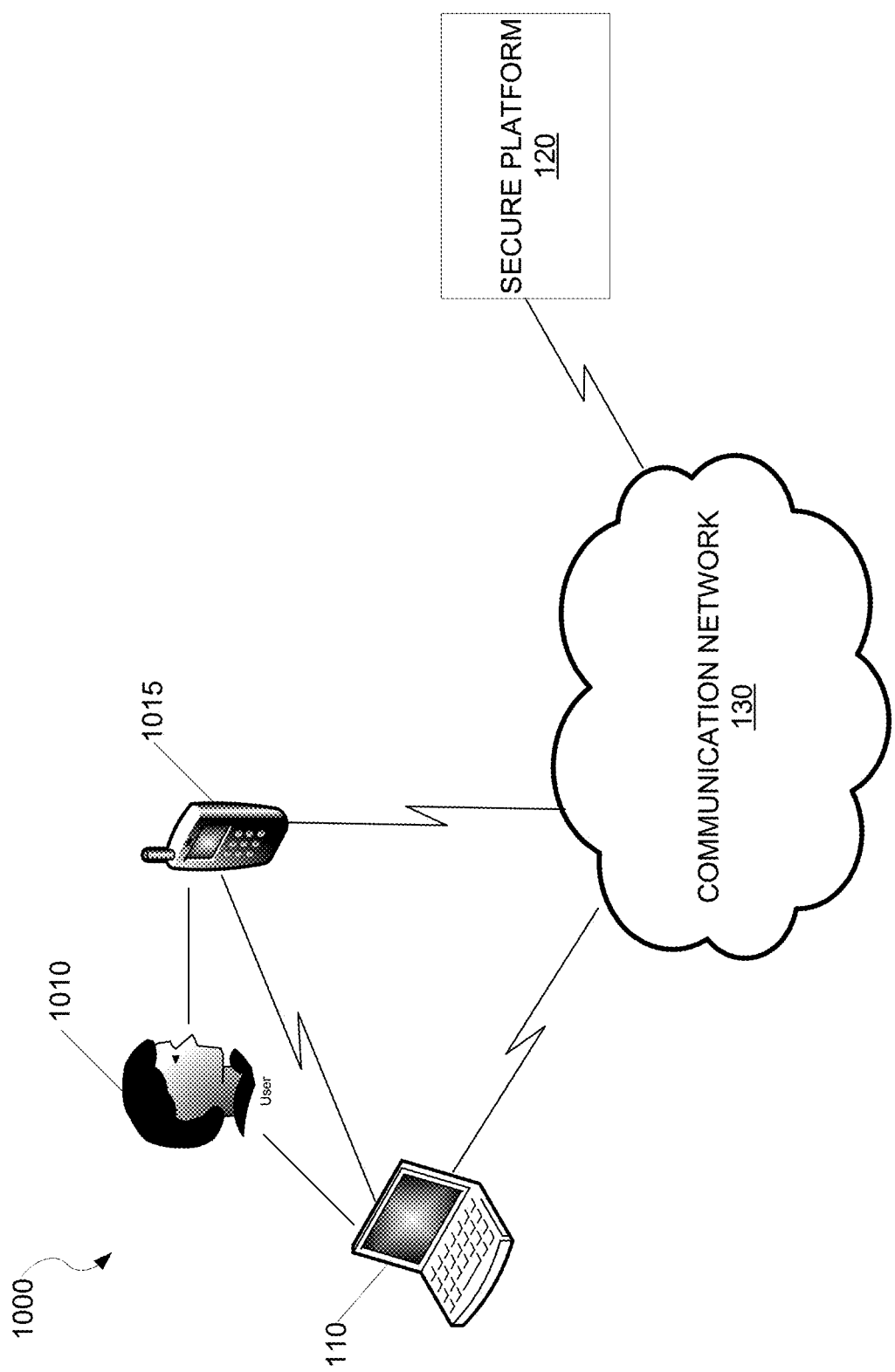
FIG. 10 is a network diagram illustrating a network environment according to various embodiments.

FIG. 10 is a network diagram illustrating a network environment 1000 according to various embodiments. Referring to FIG. 9, the user device 110 communicates with the secure platform 120 via the communication network 130. For example, in various embodiments, a user 1010 may attempt to access one or more features and functionalities available from the secure platform 120 (e.g., store and/or retrieve a data object) via the UI provided by the secure platform 120 through the user device 110.

In various embodiments, the secure platform 120 controls access based on a combination of username, user passphrase, and one or more access codes. As such, in various embodiments, the user 1010 is required to provide a correct combination of username, user passphrase, and access code to access the features and functionalities of the secure platform 120.

In various embodiments, the username and user passphrase can be provided to the secure platform 120 by manual input. For example, the user 1010 can enter a username and user passphrase through the UI provided on the user device 110. Alternately, in some embodiments, the secure platform 120 can store and manage the user passphrase. As such, in some embodiments, the user 1010 may avoid having to manually input the user passphrase to gain access to the features and functionalities of the secure platform 120.

In various embodiments, the secure platform 120 also communicates with a factored device 1015 via the communication network 130. The factored device 1015 may be any wired or wireless communication device (e.g., smartphone) that has been registered by the user 1010 as part of an initial registration process. The secure platform 120 can transmit at least one access code to the factored device 1015. For example, in some embodiments, the secure platform 120 can transmit at least one access code to the factored device 1015 in response to an attempt by the user 1010 to access one or more features and functionalities of the secure platform 120 (e.g., store and/or retrieve a data object). In order to complete MFA of the user 1010, the secure platform 120 must receive from the user device 110 and verify at least one access code in combination with the username and user passphrase.

In various embodiments, the access code that is transmitted to the factored device 1015 can be provided to the secure platform 120 in a variety of different manners including, for example, but not limited to:

Manual Input

In some embodiments, the secure platform 120 can transmit one or more access code to the factored device 1015 via short message service (SMS). The user 1010 can then manually input at least one access code through the UI provided on the user device 110 in order to complete MFA of the user 1010.

Audio Input

In some embodiments, the secure platform 120 can provide the access codes as one or more audio tones that can be played by the factored device 1015. The UI provided on the user device 110 can be configured to listen for the audio tones and to transmit the audio tones or a corresponding access code to the secure platform 120 to complete MFA of the user 1010.

Visual Input

In some embodiments, the secure platform 120 can provide the access codes as one or more visual patterns (e.g., quick response (QR) codes) that can be displayed on the factored device 1015. The UI provided on the user device 110 can be configured to scan for the visual patterns and to transmit the visual patterns or a corresponding access code to the secure platform 120 to complete MFA of the user 1010. For example, in some embodiments, the UI can activate a camera included in the user device 110 in order to scan the visual patterns displayed on the factored device 1015.

Wired or Wireless Communication

In some embodiments, the factored device 1015 can transmit the access codes to the user device 110 directly via a wired or wireless connection (e.g., Bluetooth®). The factored device 1015 can be configured to transmit the access codes automatically and in a manner that is transparent to the user 1010 and requires no manual intervention.

Variable Storage Parameters

In one embodiment, the secure platform 120 can monitor for one or more configurable triggers, which can include anomalous or notable activities and events in the interaction between the user device 110 and the secure platform 120 that indicates a security breach. The secure platform 120 can monitor for triggers including, for example, but not limited to:

Invalid Read Access Attempt

The secure platform 120 detects that an access attempt fails as a result of bad parameterization or invalid system workflow.

Invalid Retrieval Access Attempt

The secure platform 120 detects that an attempt to retrieve a data object (e.g., input, selection, or invocation of getData( )command) is performed with unexpected or bad parameter values.

Invalid Save Access Attempt

The secure platform 120 detects that an attempt to store a data object (e.g., input, selection, or invocation of saveData( )command) is performed with unexpected or bad parameter values.

Invalid Create Access Attempt

The secure platform 120 detects that an attempt to create a data object (e.g., input, selection or invocation of create( )command) is performed with unexpected or bad parameter values.

Root Shell Access

The secure platform 120 detects that a root login is attempted.

User Interface Conditions

The secure platform 120 detects security related conditions regarding the user experiences.

Server Status Conditions

The secure platform 120 detects security related conditions regarding server configuration.

Abnormal Save and/or Retrieve Frequency

The secure platform 120 determines that a number of detected attempts to store and/or to retrieve one or more data objects exceeds a threshold.

A person having ordinary skill in the art can appreciate that the secure platform 120 can be configured to recognize additional and/or different triggers without departing from the scope of the present inventive concept.

According to one exemplary embodiment, the secure platform 120 can respond to the detection of one or more triggers by varying the storage parameters that are applied to storing a data object (e.g., decomposition, obfuscation, encryption, and sharding).

In some embodiments, the secure platform 120 can respond to the detection of one or more triggers with one or more actions in addition to or instead of varying the one or more variable storage parameters that are applied in storing the data object. For example, in some embodiments, each trigger can be associated with a configurable set of actions. As such, the secure platform 120 may respond to a detection of one or more triggers by performing one or more corresponding actions including, for example, but not limited to:

Send Alert Message

The secure platform 120 can send an alert message to a user via one or more channels (e.g., SMS, email).

Suppress One or More Composite Encryption Keys

The secure platform 120 can suppress a composite encryption keys (e.g., the composite key 960) by not providing a constituent encryption key (e.g., the secondary key 965) that is automatically provided under normal circumstances.

Lock Down a Data Object

The secure platform 120 marks a data object or certain fragments of the decomposed data object as blocked to prevent further access to and interactions with (e.g., store, retrieve) the data object or certain fragments of the data object.

Lock Down a Feature or Function

The secure platform 120 stops execution of one or more specific features or functionalities (e.g., store a data object, retrieve a data object) invoked by a user.

Lock Down a Data Store

The secure platform 120 stops all interactions with some or all of the available data stores (e.g., the first data store 140, the second data store 150, the third data store 160, and the fourth data store 170).

Initiate Requirement for User to Regenerate or Change User Passphrase

The secure platform 120 can require a user to create a new passphrase prior in order to initiate a secure session and/or to invoke at least some features or functionalities provided by the secure platform 120 (e.g., store a data object, retrieve a data object). Creation of a new passphrase can cause the secure platform 120 to re-encrypt all previously stored data objects associated with the user based on the new passphrase. In some embodiments, the secure platform 120 can re-generate each encryption key in a series of cascading encryption keys based on the new passphrase.

Regenerate One or More Cascading Encryption Keys

The secure platform 120 can automatically regenerate the encryption keys that are associated with each data layer that is affected by the detected triggers.

A person having ordinary skill in the art can appreciate that the secure platform 120 can be configured to perform additional and/or different actions without departing from the scope of the present inventive concept.

Figure 11:
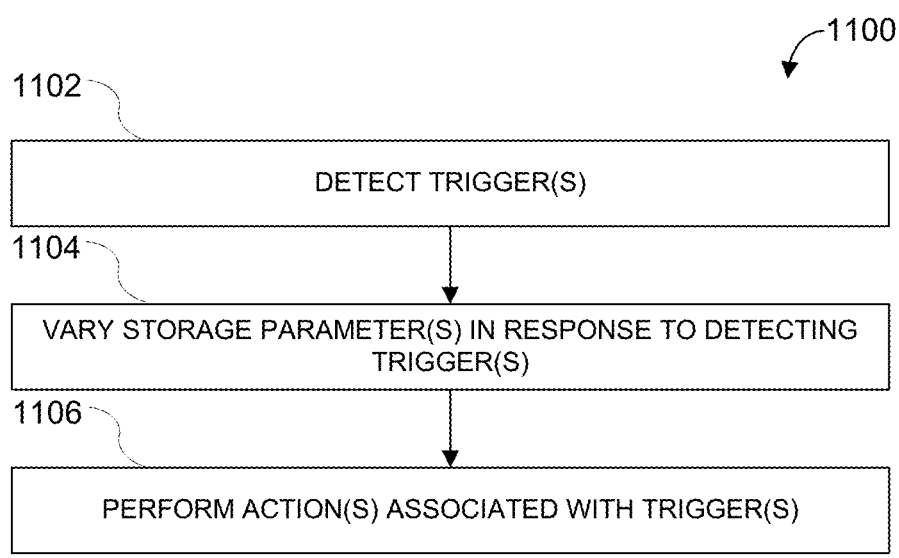
FIG. 11 is a flowchart illustrating a process for varying storage parameters according to various embodiments.

FIG. 11 is a flowchart illustrating a process 1100 for varying storage parameters according to various embodiments.

The secure platform 120 detects one or more triggers (1102). For example, the secure platform 120 can detect at least one trigger indicating a security breach.

The secure platform 120 varies at least one storage parameter in response to detecting the one or more triggers (1104). For example, in response to detecting the one or more triggers, the secure platform 120 may vary at least one storage parameter including, for example, but not limited to, a user name and passphrase associated with the user, a current security model, a type of the data object, a name of the data object, and the encryption key for each fragment of the decomposed data object. In various embodiments, the secure platform 120 can vary one or more variable storage parameters by changing a current value of at least one existing storage parameter, removing one or more existing storage parameters, and/or adding one or more new storage parameters.

The secure platform 120 performs at least one action that is associated with the one or more detected triggers (1106). In addition to varying one or more variable storage parameters, the secure platform 120 can perform additional actions that are associated with the one or more detect triggers including, for example, but not limited to, sending an alert message, suppressing one or more composite encryption keys, locking down a data object, locking down a feature or function of the secure platform 120, lock down a data store, requiring a change to user passphrase, and regenerating one or more cascading encryption keys.

Accelerated Access Records

In various embodiments, the secure platform 120 is configured to apply a dissociative storage scheme to store various data objects, which includes decomposing each data object, encrypting each fragment of the decomposed data objects, obfuscating a record locator associated with each fragment, and sharding the fragments for storage across multiple storage locations (e.g., the first data store 140, the second data store 150, the third data store 160, and the fourth data store 170).

According to one exemplary embodiment, the secure platform 120 can construct tables of accelerated access records (AARs) in order to improve an ability to search data objects that have been stored according to the dissociative storage scheme. In various embodiments, the secure platform 120 can construct AAR tables (e.g., equality AAR tables, range match AAR tables) that can be responsive to different types of accelerated data access queries (ADAQs) including, for example, but not limited to, equality ADAQs and range match ADAQs.

Various AAR tables store information required for accelerated searches on at least data objects or portions of data objects that have been stored according to the dissociative storage scheme. However, AAR tables (and the information stored therein) are separate from the actual data objects that have been stored by the secure platform 120.

In various embodiments, the secure platform 120 can apply one or more security models on a particular AAR table, which obscure and encrypt the information included in each AAR entry of the AAR table. However, the security models applied to an AAR table still affords rapid access to the information included in the AAR table. In various embodiments, the secure platform 120 can respond to ADAQs by referencing the information included in the AAR tables instead of reversing the dissociative storage scheme that was applied to store the various data objects and executing the ADAQs directly on the stored data objects.

In one embodiment, an initial setup process is required to define the types of fields and attributes that will be transformed into AARs and define the types of fields and attributes of the AARs to allow for various ADAQs (e.g., equality, range match).

A first step in the initial setup process is to create field definitions that identify a field name, provide specific attributes about the field, the types of data that will be stored in the fields, and the security models used to secure the data. Examples of field definitions are provided below, and include information on a field identifier (e.g., salary, age, zip code, state, first name, last name, city), a type of security model used to secure the data (e.g., encryption, obfuscation), and a type or format of character that the field value will contain (e.g., decimal, integer, character, string):

FieldDefinition{field identifier: salary, securitymodel: 1.0, type: decimal(2)}
FieldDefinition{field identifier: age, securitymodel: 1.0, type: integer}
FieldDefinition{field identifier: zipcode, securitymodel: 1.0, type: integer}
FieldDefinition{field identifier: state, securitymodel: 1.0, type: char(2)}
FieldDefinition{field identifier: firstname, securitymodel: 1.0, type: String}
FieldDefinition{field identifier: lastname, securitymodel: 1.0, type: String}
FieldDefinition{field identifier: city, securitymodel: 1.0, type: String}

Once the field definitions are understood, AAR definitions can then be created to identify the fields, types of data, and security models that will be used in creating each AARs entry in the AAR tables. The AAR definitions can also contain information about the type of queries (e.g., equality or range match) that will be executed on each AAR table, as separate AAR tables are required for each type of query. An equality ADAQ in the AAR definition indicates the AAR entries in a particular AAR table are formatted to respond to ADAQs seeking a specific value. By contrast, a range match ADAQ in the AAR definition indicates that the AAR entries in a particular AAR table are formatted to respond to ADAQs that seek one or more ranges of values and/or wild card matches.

A list of example AAR definitions is provided below, and includes the query type, the field identifier and the security model that is applied to each entry in the AAR table. Note that the inclusion of multiple field identifiers in a single AAR allows for a search to be conducted on multiple fields at the same time (such as a query for users of a certain age who make a certain salary). Examples of AAR definitions include:

AAR {type: equalityquery, field identifier: [salary], securitymodel: 2.0}
AAR {type: equalityquery, field identifier: [age], securitymodel: 2.0}
AAR {type: equalityquery, field identifier: [zipcode], securitymodel: 2.0}
AAR {type: equalityquery, field identifier: [salary, age], securitymodel: 2.0}
AAR {type: rangequery, field identifier: [age], securitymodel: 2.0}
AAR {type: rangequery, field identifier: [lastname], securitymodel: 2.0}
AAR {type: rangequery, field identifier: [salary], securitymodel: 2.0}

Equality ADAQ

In response to an equality ADAQ, the secure platform 120 can search an equality AAR table to locate AAR entries having an exact match to a given value for one or more specified fields. For example, an equality ADAQ could seek users in a data store with a salary of $50,000, a customer with a specific social security number 123-45-678, or patients living in an area with the zip code 12345. Accordingly, the target fields for these exemplary equality ADAQs may include salary, social security number, and zip code respectively.

One or more equality AAR tables are required to be set up in order to=to execute an equality query ADAQ. Setting up an equality AAR table includes identifying target fields that should be made available for equality ADAQs. One AAR entry in an equality AAR table can include at least one target field (e.g., salary, social security number, zip code, or any combination thereof).

An AAR table can be set up manually by selecting one or more target field. The secure platform 120 can be continuously update existing AAR tables when new data relevant to the target fields is saved by the secure platform 120. For example, when the secure platform 120 stores a new data object, the secure platform 120 can create and add a new AAR entry in a corresponding AAR table and/or create a new AAR table including the new AAR entry in the event that a corresponding AAR table does not yet exist. For example, any number of post-processing algorithms (e.g. machine learning, artificial intelligence, data parsing, image processing, and the like) can be implemented via a plug-in module (or included in an existing software application) to create a AAR entry while the data object is stored and/or in event that ADAQ does not exist in an existing data map. The use of a plug-in module in some embodiments, may allow evolving requirements, changing data flow, and new technology and techniques to be incorporated in creation of AAR tables and/or AAR entries on the fly in situations where such techniques were not available.

An AAR entry that is responsive to one or more equality ADAQs includes an AAR key and AAR value pair. The AAR key is a record locator that is built by obfuscating at least one field identify based on a corresponding field value. For example, for a field identifier "salary" and corresponding field value "$50,000," the secure platform 120 can generate an AAR key by applying an obfuscation function to both the field identifier "salary" and the field value $50,000 (e.g., AAR key=obfuscateAlgorithm(salary, $50,000)).

In one embodiment, the secure platform 120 applies a one-way function to generate the AAR key. The one-way function cannot be easily reversed. As such, it is generally impossible to reverse compute the field identifier or the field value that were used to generate the AAR key.

In one embodiment, the AAR value is an encrypted list of identifiers (e.g., account identifiers) that have the same field value for the field identifiers. Continuing the foregoing example, the AAR value corresponding to the AAR key generated from field identifier "salary" and field value "$50,000" are a list of account identifiers with salaries of $50,000. In one embodiment, the secure platform 120 can obscure (e.g., encrypt, obfuscate) the AAR value to further secure the data.

FIG. 12 illustrating a data collection 1200 according to various embodiments. In various embodiments, the secure platform 120 can apply a dissociative storage scheme to the data collection 1200. As such, the secure platform 120 can decompose, obfuscate, encrypt, and shard the data collection 1200 across multiple data stores (e.g., the first data store 140, the second data store 150, the third data store 160, and the fourth data store 170). The secure platform 120 must reverse the dissociative storage scheme applied to the data collection 1200 in order to execute any queries directly on the data collection 1200.

FIG. 13 illustrates an equality AAR table 1300 according to various embodiments. Referring to FIGS. 12-13, the equality AAR table 1300 is configured to respond to equality ADAQs. In various embodiments, the secure platform 120 may generate the equality AAR table 1300 in order to provide rapid responses to equality ADAQs with respect to the data collection 1200.

As shown in FIG. 13, AAR keys are listed in the left column of the equality AAR table 1300 while the corresponding AAR values are listed in the right column of the equality AAR table 1300. Each row in the equality AAR table 1300 represents a separate AAR entry.

A first row 1310 of the equality AAR table 1300 includes an AAR key generated from a field identifier "salary" and a field value "$50,000." For example, the secure platform 120 may have applied an obfuscation function to the field identifier and field value (e.g., AAR key=obfuscate-Algorithm(Salary, $50,000)) to generate the AAR key in the first row 1310.

The first row 1310 further includes an AAR value derived from the account identifiers of individuals that have a $50,000 salary. For example, the secure platform 120 may obscure (e.g., obfuscate, encrypt) account identifiers from the data collection 1200 of individuals that have salaries of $50,000 (e.g., JohnSmith, JaneDoe). Thus, the first row 1310 further includes an AAR value of EncryptionAlgorithm ([JohnSmith, JaneDoe]).

The equality AAR table 1300 can include additional rows including, for example, but not limited to, a second row 1320, a third row 1330, and a fourth row 1340. As shown in the second row 1320, the third row 1330, and the fourth row 13340, a single AAR key may be generated from multiple fields (e.g., "salary" and "age"). As such, a single equality ADAQ can be executed to locate exact values for multiple fields (e.g., salary=$50,000, age=55).

For an equality query search of data, the field identifier and field value pair is always known. Since the field identifier and field value pair is stored as obfuscated values in the form of an AAR key, the significance of this information is hidden and cannot be determined by simple examination of the AAR key. The obfuscated value of the AAR key is used as the primary key to locate an AAR entry within an AAR table. Thus, an equality ADAQ for a specific field value (e.g., $50,000) of a particular field identifier (e.g., salary) is completed simply by locating a matching AAR key and returning the corresponding AAR value (e.g., account identifiers of individuals with a $50,000 salary).

Figure 14:
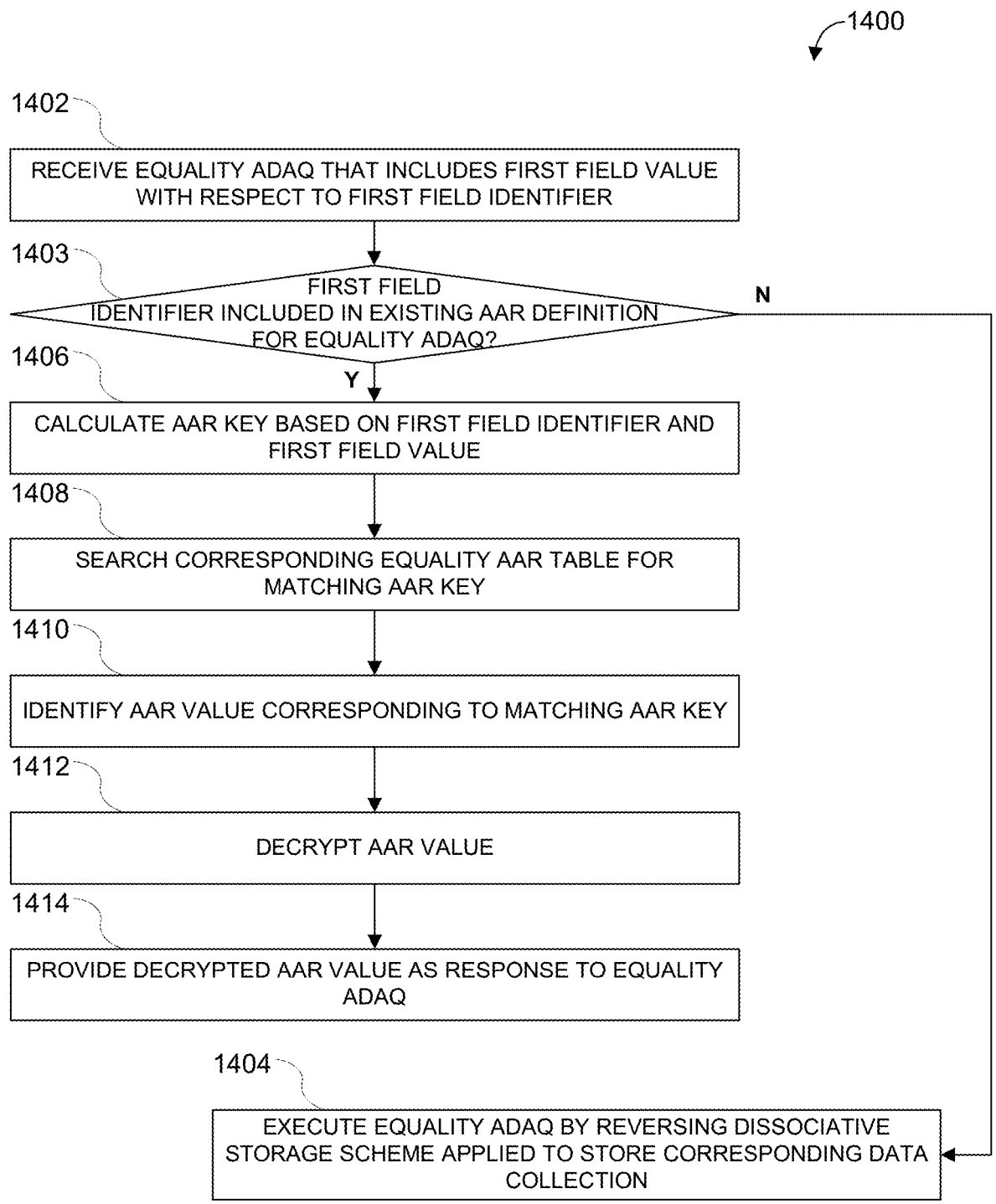
FIG. 14 is a flowchart illustrating a process for performing an equality accelerated data access query according to various embodiments.

FIG. 14 is a flowchart illustrating a process 1400 for performing an equality ADAQ according to various embodiments. Referring to FIGS. 1 and 14, the process 1400 can be performed by the secure platform 120.

The secure platform 120 receives an equality ADAQ that includes a first field value with respect to a first field identifier (1402). For example, the equality ADAQ may seek to identify individuals who have a $50,000 salary. In various embodiments, the equality ADAQ may indicate specific values for multiple field identifiers (e.g., individuals who are age 55 and have a salary of $50,000).

The secure platform 120 determines whether the first field identifier is included in an existing AAR definition for equality ADAQs (1403). For example, the secure platform 120 may examine the existing AAR definitions to determine whether an existing AAR definition for equality ADAQs includes the first field identifier.

If the secure platform 120 determines that the first field identifier is not included in an existing AAR definition for equality ADAQs (1403-N), the secure platform 120 may execute the equality ADAQ by reversing the dissociative storage scheme that was applied to store a corresponding data collection (1404). In some embodiments, if the first field identifier is not included in an existing AAR definition, a new AAR definition and/or AAR entry may be generated, for example, based on the first field identifier and first field value, as described further below.

Alternately, if the secure platform 120 determines that the first field identifier is included in an existing AAR definition for equality ADAQs (1403-Y), the secure platform 120 calculates an AAR key based on the first field identifier and the first field value (1406). For example, the secure platform 120 can calculate an AAR key by applying an obfuscation function on the first field identifier (e.g., salary) and the first field value (e.g., $50,000).

The secure platform 120 searches a corresponding equality AAR table for a matching AAR key (1408) and identifies AAR value corresponding to matching AAR key (1410). The secure platform 120 decrypts the AAR value (1412) and provide the decrypted AAR value as a response to the equality ADAQ (1414). For example, the AAR value corresponding to the matching AAR key may include an encrypted list of account identifiers (e.g., John Smith, Jane Doe) of individuals whose salaries are $50,000. The secure platform 120 may decrypt the AAR value and return the decrypted AAR value as the result of the equality ADAQ.

Range Match ADAQ

A range match ADAQ is a search performed for a range of values, and may also include wild card searches for open-ended values. For example, a range match ADAQ could find employees with a salary between a first value x and a second value y, find customers who are between x and y years old, or find patients with a last name Smi #, where # denotes a wildcard character.

As with the equality query searches, an initial setup may be required to identify target fields that may be used to create AAR entries in range match AAR table. A single AAR entry in a range entry AAR table can include at least one field identifier (e.g., age, zip code, and/or salary).

An AAR entry in a range match AAR table has a different format than an AAR entry in an equality AAR table. Specifically, the AAR key portion of an AAR entry in a range match AAR table includes one or more field identifiers but not the corresponding field values. To generate the AAR keys for a range match AAR table, the secure platform 120 can apply an obfuscation function to the one or more field identifiers in order to obscure any meaning and significance.

The corresponding field values are stored as plain text values in a separate column in the range match AAR table. In some embodiments, storing the field values as such (e.g., in plaintext) may exploit the innate efficiencies of some databases (e.g., mongoDB®). Thus, in response to a range match ADAQ, the plain text values of the field values can be rapidly compared to values indicated in the range match ADAQ.

To generate each AAR value in a range match AAR table, a list of matching account identifiers having certain values for a particular field identifier is encrypted. As such, a range match AAR table includes a third column containing the AAR values.

FIG. 15 illustrates a range match AAR table 1500 according to various embodiments. Referring to FIGS. 12 and 15, the range match AAR table 1500 can be generated based on the data collection 1200.

As shown in FIG. 15, the range match AAR table 1500 includes a plurality of AAR keys, which are listed in the left column. The corresponding field values are stored as plain text values and are listed in the center column. The corresponding AAR values are listed in the right column.

The range match AAR table 1500 includes a first row 1510. The first row 1510 includes an AAR key that was generated based on the field name salary. For example, the secure platform 120 can apply an obfuscation function to the field name salary to generate the AAR key included in the first row 1510.

The first row 1510 further includes a field value of $50,000, which is stored in as a plain text value. Additionally, the first row 1510 includes an AAR values that was generated by encrypting account identifiers of individuals having a salary of $50,000 (e.g., JohnSmith, JaneDoe).

The range match AAR table 1500 can include additional rows including, for example, but not limited to, a second row 1520, a third row 1530, and a fourth row 1540. As shown in the second row 1520, the third row 1530, and the fourth row 1540, a single AAR key may be generated from multiple field identifiers (e.g., salary and age). As such, a single range match ADAQ can be executed to locate a range of values for multiple fields.

Figure 16:
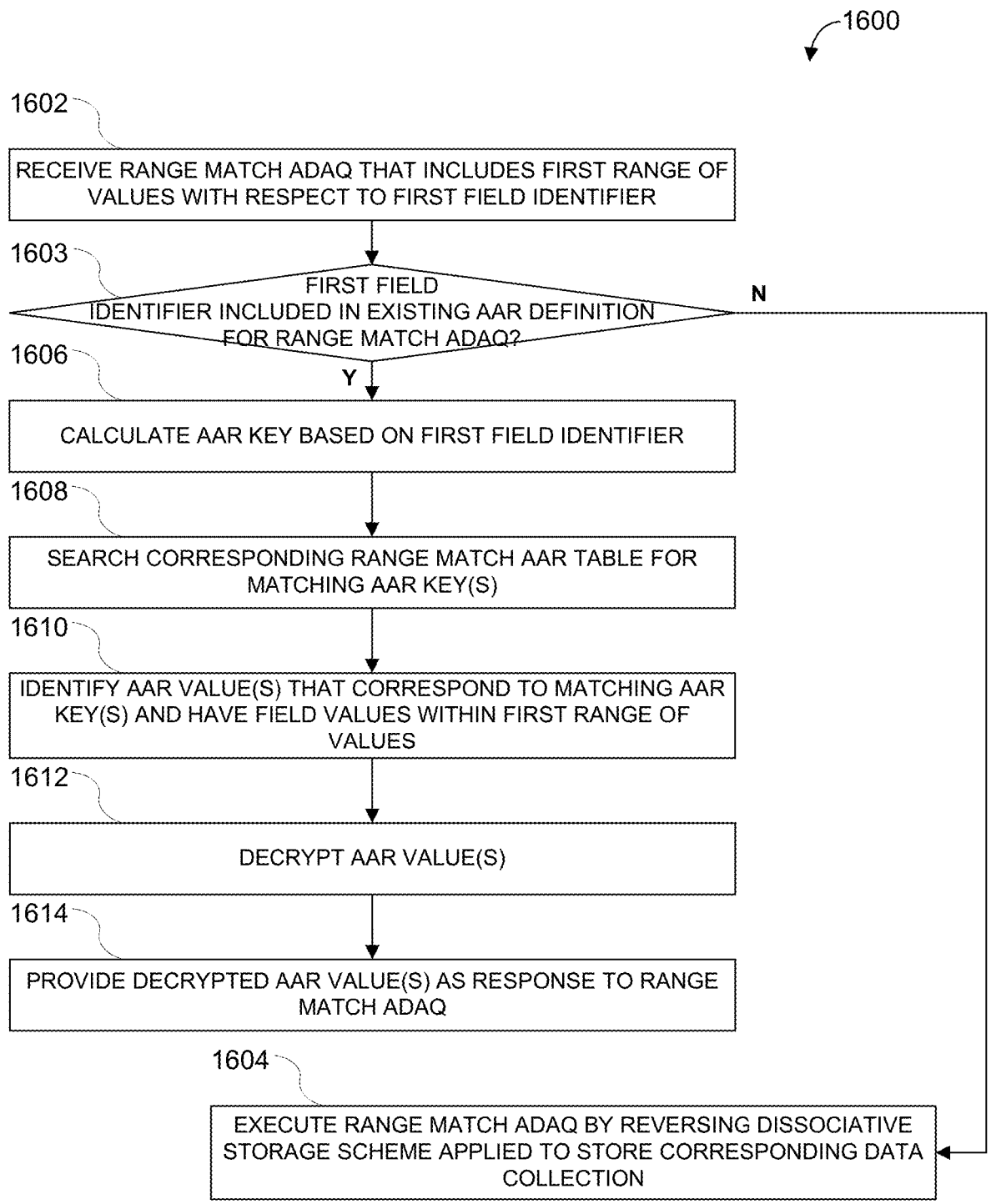
FIG. 16 is a flowchart illustrating a process for performing a range match accelerated data access query according to various embodiments.

FIG. 16 is a flowchart illustrating a process 1600 for performing a range match ADAQ according to various embodiments. Referring to FIG. 16, the process 1600 may be performed by the secure platform 120.

The secure platform 120 receives a range match ADAQ that includes a first range of values with respect to a first field identifier (1602). For example, the equality ADAQ may seek to identify individuals who have salaries between $45,000 and $50,000. In some embodiments, the range match ADAQ may indicate specific ranges of values for multiple field identifiers (e.g., individuals who are between ages of 40-55 and have a salary between $45,000-$50,000).

The secure platform 120 determines whether the first field identifier is included in an existing AAR definition for range match ADAQs (1603). For example, the secure platform 120 may examine the existing AAR definitions to determine whether an existing AAR definition for range match ADAQs includes the first field identifier.

If the secure platform 120 determines that the first field identifier is not included in an existing AAR definition for range match ADAQs (1603-N), the secure platform 120 may execute the range match ADAQ by reversing the dissociative storage scheme that was applied to store a corresponding data collection (1604). In some embodiments, if the first field identifier is not included in an existing AAR definition, a new AAR definition and/or AAR entry may be generated, for example, based on the first field identifier, as described further below.

Alternately, if the secure platform 120 determines that the first field identifier is included in an existing AAR definition for range match ADAQs (1603-Y), the secure platform 120 calculates an AAR key based on the first field identifier (1606). For example, the secure platform 120 can calculate an AAR key by applying an obfuscation function on the first field identifier (e.g., salary).

The secure platform 120 searches a corresponding range match AAR table for one or more matching AAR keys (1608). The security platform 120 identifies one or more AAR values that correspond to the matching AAR keys and have field values that are within the first range of values (1610). The secure platform 120 decrypts the one or more AAR values (1612) and provides the decrypted AAR values as a response to the range match ADAQ (1614). For example, one or more AAR values may correspond to matching AAR keys and have field values that are within the first range (e.g., JohnBrown, JohnSmith, and JaneDoe). The secure platform 120 may decrypt the AAR values and return the decrypted AAR values as the result of the range match ADAQ.

In some instances, field values may reveal sensitive information and cannot be stored as plain text values. Thus, in some embodiments, to protect field values, the secure platform 120 can decompose sensitive data into different strings and stored the strings separately.

Generating and Updating Equality AAR Table

Figure 17:
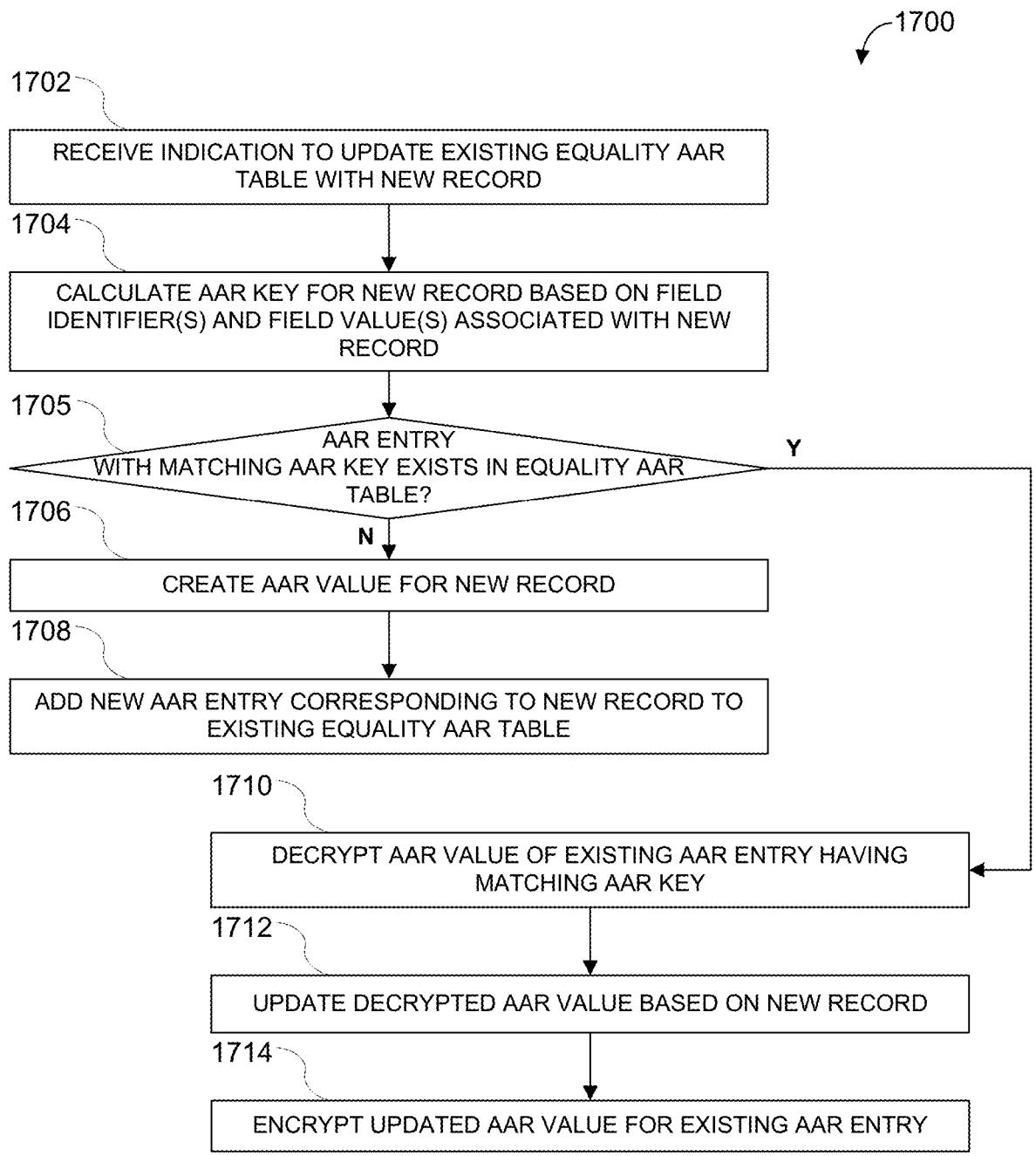
FIG. 17 is a flowchart illustrating a process for updating an equality accelerated access record table according to various embodiments.

FIG. 17 is a flowchart illustrating a process 1700 for updating an equality AAR table according to various embodiments. Referring to FIGS. 1 and 17, the process 1700 may be performed by the secure platform 120.

Figure 18A:
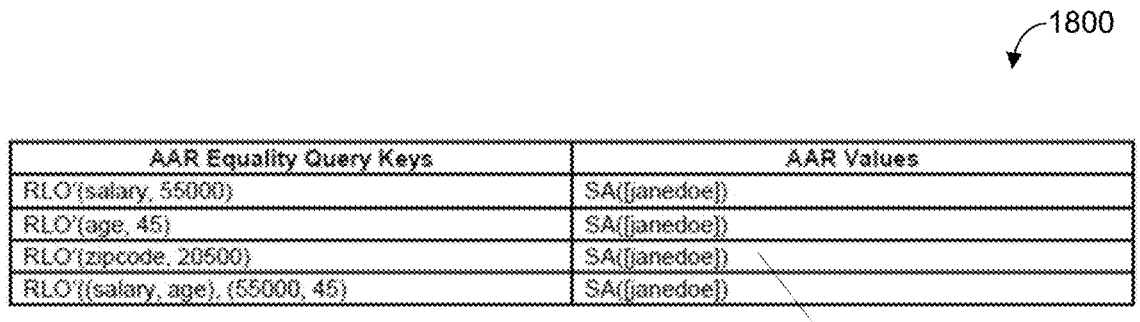
FIG. 18A illustrates an equality accelerated access record table according to various embodiments.

FIG. 18A illustrates an equality AAR table 1800 according to various embodiments. Referring to FIGS. 17 and 18A, the process 1700 may be performed to update the equality AAR table 1800 based on one or more new records.

The secure platform 120 receives an indication to update an existing equality AAR table with a new record (1702). For example, the secure platform 120 may have stored a data object (e.g., in response to a saveData( )command input, selected, or otherwise invoked through the UI provided via the user device 110). Storing the data object or at least some fragments of the data object may cause an update to an existing equality AAR table (e.g., the equality AAR table 1800).

The secure platform 120 calculates an AAR key for the new record based on one or more field identifiers and corresponding field values associated with the new record (1704). The secure platform 120 determines whether an AAR entry with a matching AAR key already exists in the equality AAR table (1705). In some embodiments, the secure platform 120 may determine that an AAR entry with a matching AAR key does not already exist in the equality AAR table (1705-N).

Figure 18B:
FIG. 18B illustrates a first accelerated access record entry according to various embodiments.

For example, FIG. 18B illustrates a first AAR entry 1810 according to various embodiments. The first AAR entry 1810 corresponds to a first new record that is to be added to the equality AAR table 1800. The first new record is for an individual with an account identifier "JohnSmith" who has a salary of $50,000. As such, the corresponding first AAR entry 1810 includes field identifier "salary" and a field value of "$50,000." The AAR key for the first new record is determined by applying an obfuscation function to the field identifier (e.g., salary) and the field value (e.g., $50,000). However, the equality AAR table 1800 does not already include an AAR key for RLO' (salary, 50,000).

In response to determining that a matching AAR key does not already exist in the equality AAR table, the secure platform 120 creates an AAR value for the new record (1706). For example, the secure platform 120 may encrypt the account identifier (e.g., JohnSmith) associated with the first new record. The secure platform 120 adds a new AAR entry corresponding to the new record to the existing equality AAR table (1708). For example, the secure platform 120 inserts the first AAR entry 1810, which includes the new AAR key and AAR value for the first new record, into the equality AAR table 1800.

Alternately, in some embodiments, the secure platform 120 may determine that an existing AAR entry with a matching AAR key already exists in the equality AAR table (1705-Y). For example, the equality AAR table 1800 includes an existing AAR entry 1820 for individuals who reside in the zip code 20500, which includes an individual with the account identifier "JaneDoe." A second new record may include another individual who resides in the zip code 20500 and having an account identifier "JohnSmith."

Figure 18C:
FIG. 18C illustrates an updated accelerated access record entry according to various embodiments.

FIG. 18C illustrates an updated AAR entry 1830 according to various embodiments. In various embodiments, the updated AAR entry 1830 reflects updates to the existing AAR entry 1820 based on the second new record. As shown in FIG. 18C, the updated AAR entry 1830 indicates that individuals residing in the zip code 20500 include both the individual with the account identifier "JaneDoe" and the individual with the account identifier "JohnSmith."

To update the existing AAR entry having the matching AAR key, the secure platform 120 decrypts an AAR value of the existing AAR entry having a matching AAR key (1710). For example, the secure platform 120 decrypts the AAR value associated with the existing AAR entry 1820 already included in the equality AAR table 1800.

The secure platform 120 updates the decrypted AAR value based on new record (1712) and encrypts the updated AAR value for the existing AAR entry (1714). For example, the secure platform 120 can decrypt the AAR value associated with the existing AAR entry 1820, which includes an account identifier for "JaneDoe." The secure platform updates the decrypted AAR value based on the second new record including by adding the account identifier "JohnSmith" to the existing account identifiers (e.g., JaneDoe) already included in the AAR value for the existing AAR entry 1820.

Figure 18D:
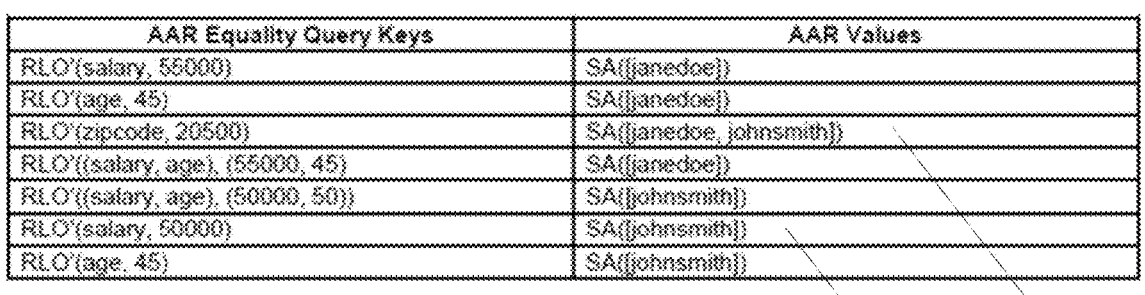
FIG. 18D illustrates an updated equality accelerated access record table according to various embodiments.

FIG. 18D illustrates an updated equality AAR table 1850 according to various embodiments. Referring to FIGS. 18A-D, the updated equality AAR table 1850 includes the first AAR entry 1810, which was inserted as a result of the addition of the first new record. Moreover, the updated equality AAR table 1850 further includes the updated AAR entry 1830, which reflects updates (e.g., addition of account identifier "JohnSmith") based on the second new record.

In one example, the secure platform 120 receives an indication to generate new AAR entry based on a type of the data object (e.g., file type such as video file, image file, audio file, word processing files, and the like) and extract field identifiers and field values therefrom based on this type. In some embodiments, the new AAR entry may be an update to an existing equality AAR table or the new AAR entry may be a first entry of a new AAR table generated based on the data object. For example, the secure platform 120 may have stored a data object. The secure platform 120 calculates an AAR key for the new record based on one or more field identifiers and corresponding field values associated with the new record (1704). The secure platform 120 determines whether an AAR entry with a matching AAR key already exists in the equality AAR table (1705). In some embodiments, the secure platform 120 may determine that an AAR entry with a matching AAR key does not already exist in the equality AAR table (1705-N).

For example, the data object may be a video file of a parking structure including various vehicles each having a license plate. In one example, image processing techniques may be implemented to recognize and extract a new record for a blue care having a license plate number of 1ABC123. As such, the corresponding AAR entry includes a field identifier "license_plate" and a field value of "1ABC123." The AAR key for the first new record is determined by applying an obfuscation function to the field identifier (e.g., license plate) and the field value (e.g., 1ABC123). The equality AAR table for the data object may not already include an AAR key for RLO' (license_plate, 1ABC123) or the AAR table may not exist.

In response to determining that a matching AAR key does not already exist, the secure platform 120 creates an AAR value for the new record (1706). For example, the secure platform 120 may encrypt the account identifier (e.g., BlueCar) associated with the first new record. The secure platform 120 adds a new AAR entry corresponding to the new record to the existing equality AAR table (1708) or generates a new equality AAR table based on the new record. The secure platform 120 may analyze and generate a plurality of AAR entries for each object included in the data object.

Additionally, in some embodiments, the secure platform 120 may determine that an existing AAR entry with a matching AAR key already exists in the equality AAR table (1705-Y). For example, the equality AAR table includes an existing AAR entry for blue cars, which includes a vehicle with the license plate 9XYZ789. Thus, the AAR entry may be updated to include both the blue cars with the license plate "1ABC123" and license plate "9XYZ789," in accordance with the description herein.

In some embodiments, the generating and/or updating of the AAR table and/or AAR entries may be automatic in response to storing the data object. For example, the AAR entries may be generated prior, during, or following applying a decomposition function to the data object. Alternatively, as described above, generating and/or updating the AAR table and/or entries thereof may be based on an ADAQ that is determined to not have a matching AAR key in an existing AAR table (e.g., a miss query), as described above.

Additionally, either alone or in combination, the secure platform may be able to identify persons and/or characteristics of a person (e.g., hair color, face shape, eye color, height, etc.), vehicle make and models, and other objects in a video file for generating AAR entries in accordance with the above. Such implementations may be useful in surveillance and security applications for tracking and identifying persons in a secure and encrypted manner. Additionally, the secure platform 120 may identify frequencies, voices, words, language, and other sounds in an audio file for generating new records therefrom. Further still, AAR records may be generated during data storage based on parsing the data object of specific file types, including metadata associated therewith, and generating AAR entries based on the parsed data object. As document formats evolve new ones may be created, and plug-in modules may be added to the secure platform 120 to support new file formats and seamlessly incorporate the new document types into the AAR data flow.

While certain example processing algorithms have been described herein, it will be appreciated that the examples algorithms are not intended to be limiting. For example, any number of processing algorithms and/or plug-in modules may be used to extract field values and/or field identifiers. Example algorithms include, but are not limited to, machine learning, artificial intelligence, image processing techniques (e.g., machine vision, stitching, filtering, thresholding, pixel counting, segmentation, edge detection and tracking, color analysis, object recognition, pattern recognition, blob detection and extraction, optical character recognition, and the like), parsing of data objects and/or associated metadata, and the like.

Generating and Updating Range Match AAR Table

Figure 19:
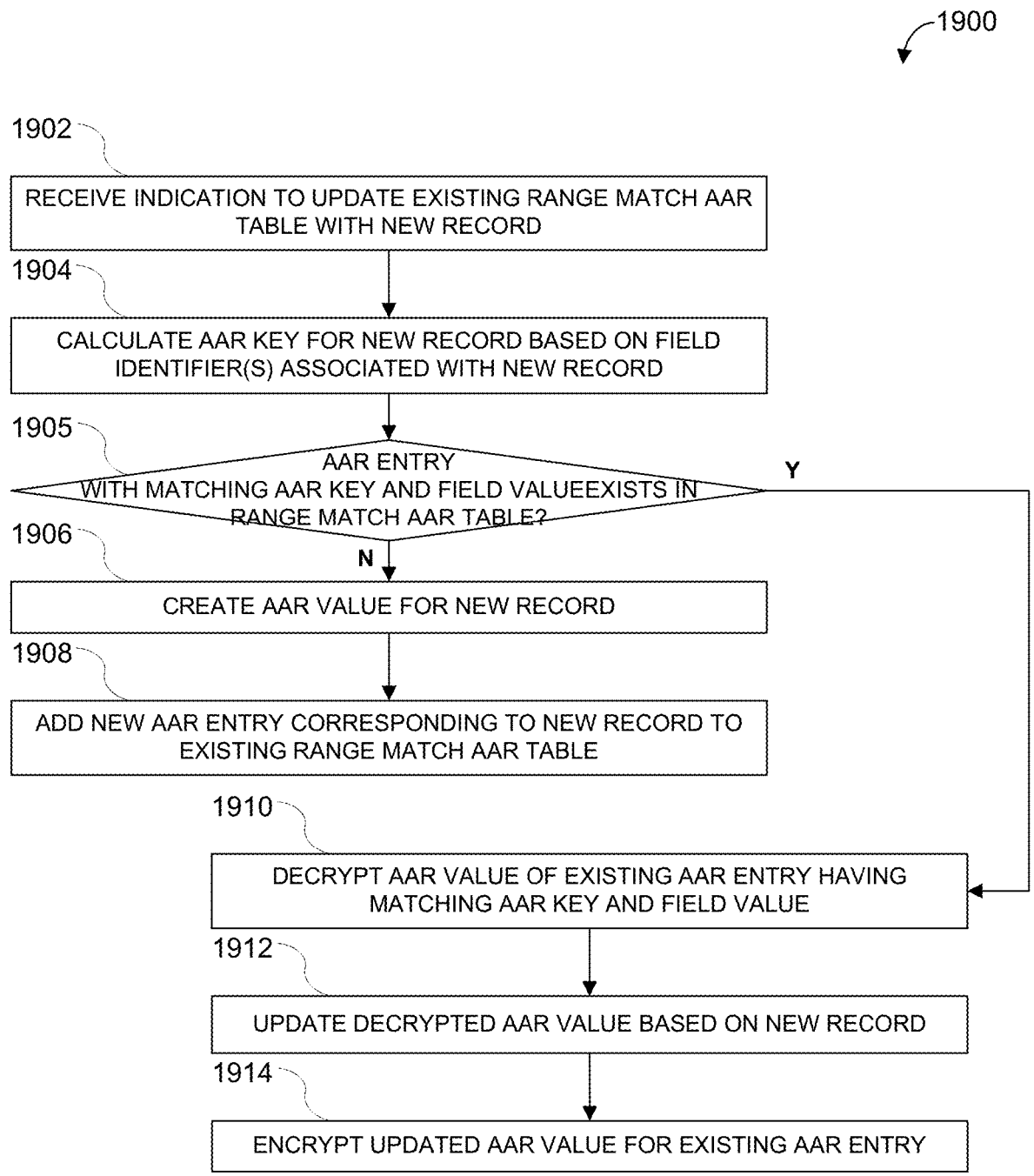
FIG. 19 is a flowchart illustrating a process for updating a range match accelerated access record table according to various embodiments.

FIG. 19 is a flowchart illustrating a process 1900 for generating and/or updating a range match accelerated access record table according to various embodiments. Referring to FIGS. 1 and 19, the process 1900 may be performed by the secure platform 120.

The secure platform 120 receives an indication to update an existing range match AAR table with a new record (1902). For example, the secure platform 120 may have stored a data object (e.g., in response to a saveData( )command input, selected, or otherwise invoked through the UI provided via the user device 110). Storing the data object or at least some fragments of the data object may cause an update to an existing equality AAR table.

The secure platform 120 calculates an AAR key for the new record based on one or more field identifiers associated with the new record (1904). In various embodiments, the secure platform 120 calculates the AAR key for the new record by applying an obfuscation function to the field identifier associated with the new record.

The secure platform 120 determines whether an AAR entry with a matching AAR key and field value already exists in the range match AAR table (1905). In some embodiments, the secure platform 120 may determine that an AAR entry with a matching AAR key and field value does not already exist in the range match AAR table (1905-N). As such, the secure platform 120 creates a new AAR value for the new record (1906) and adds a new AAR entry corresponding to the new record to the existing range match AAR table (1908). For example, the secure platform 120 may encrypt the account identifier associated with the new record. The secure platform 120 inserts the new record as a new AAR entry into the existing range match AAR table. The new AAR entry may include the AAR key, field value (e.g., stored in plain text), and the AAR value associated with the new record.

Alternately, in some embodiments, the secure platform 120 may determine that an AAR entry with a matching AAR key already exists in the range match AAR table (1905-Y). Thus, the secure platform 120 decrypts an AAR value of the existing AAR entry having a matching AAR key and field value (1910). The secure platform 120 updates the decrypted AAR value based on the new record (1912) and encrypts the updated AAR value for the existing AAR entry (1914). For example, the secure platform 120 can decrypt the AAR value associated with the existing AAR entry and update the decrypted AAR value with the new record including by adding the account identifier associated with the new record to the account identifiers already included in the AAR value of the existing AAR entry.

The process 1900 may be similar to the above described process 1700, except where otherwise indicated below. Accordingly, a range match AAR entry and/or table may be generated and updated in a manner substantially similar to that described above in connection to FIG. 17, except where otherwise described herein.

FIG. 20A illustrates a range match AAR table 2000 according to various embodiments. FIG. 20B illustrates an AAR entry 2010 according to various embodiments. Referring to FIGS. 19 and 20A-B, the secure platform 120 may update the range match AAR table 2000 by adding a new record corresponding to the AAR entry 2010.

FIG. 20C illustrates an updated range match AAR table 2050 according to various embodiments, Referring to FIGS. 19 and 20A-C, the updated range match AAR table 2050 includes the AAR entry 2010.

Figure 21:
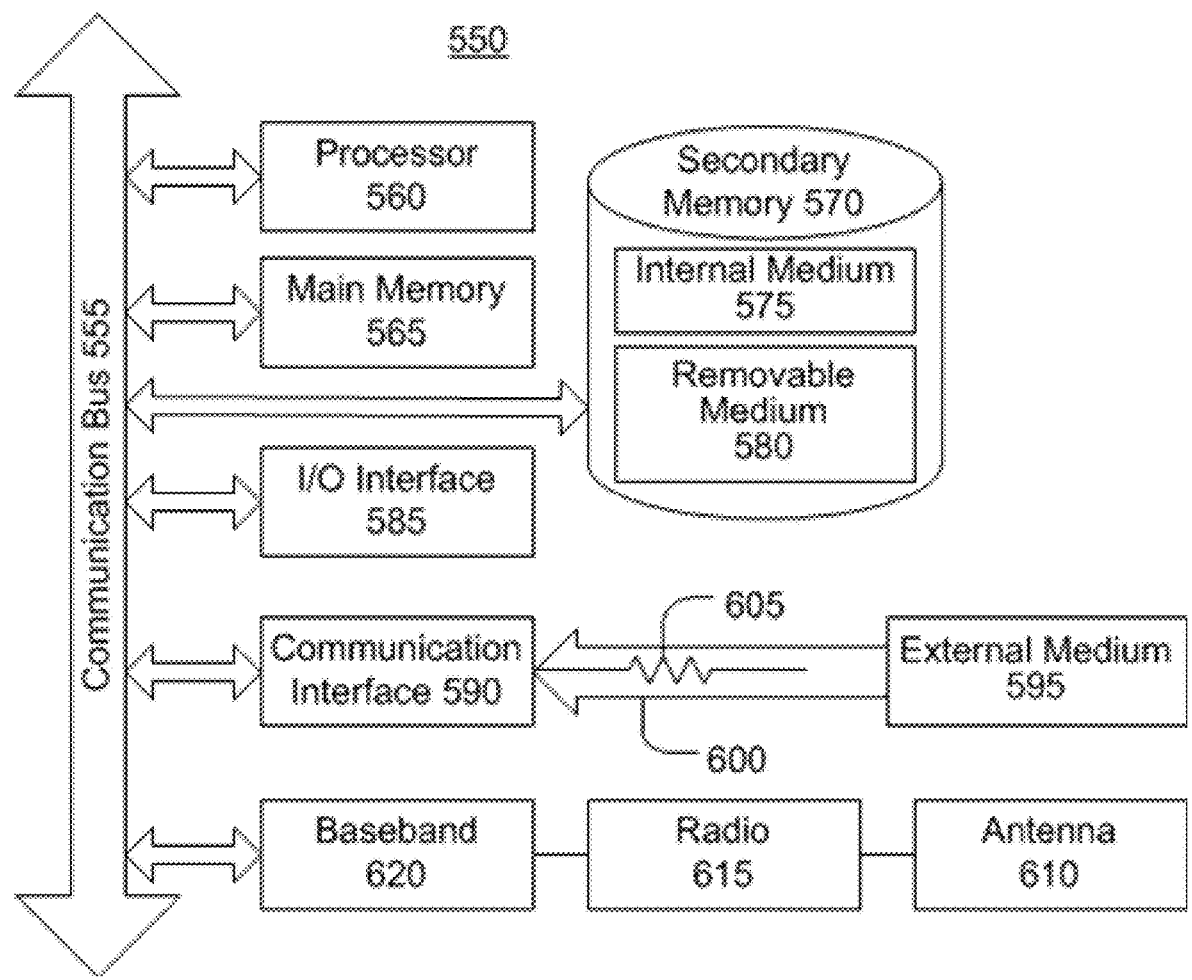
FIG. 21 is a block diagram that illustrates a system according to various embodiments.

FIG. 21 is a block diagram illustrating wired or wireless system 550 according to various embodiments. Referring to FIGS. 1 and 21, the system 550 may be used to implement the secure platform 120.

In various embodiments, the system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, the secondary memory 570 may include other similar means for allowing computer programs or other data or instructions to be loaded into the system 550. Such means may include, for example, an external storage medium 595 and a communication interface 590. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are the removable medium 580 and a communication interface, which allow software and data to be transferred from an external storage medium 595 to the system 550.

System 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. The electrical communication signals 605 are preferably provided to communication interface 590 via a communication channel 600. In one embodiment, the communication channel 600 may be a wired or wireless network, or any variety of other communication links. Communication channel 600 carries the electrical communication signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The processor 560 has access to one or more data storage areas including, for example, but not limited to, the main memory 565 and the secondary memory 570. The processor 560 is preferably configured to execute instructions (i.e., computer programs or software) that can be stored in the main memory 565 or in the secondary memory 570. Computer programs can also be received from the baseband processor 610 and stored in the main memory 565 or in the secondary memory 570, or executed upon receipt. Such computer programs, when executed, enable the system 550 to perform the various functions of the present invention as previously described. For example, the main memory 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for generating a data map for retrieval of a data object, the method comprising:
   receiving an indication to generate a data entry for the data map, the data entry corresponding to a field identifier and a field value related to the field identifier;
   obfuscating the field identifier to generate a record locator associated with the data entry based, at least in part, on one or more variable storage parameters; and
   encrypting the field identifier and field value and storing the data entry in the data map as an encrypted field identifier and field value in association with the record locator.

2. The method of claim 1, further comprising obfuscating the field value and field identifier to generate the record locator associated with the data entry.

3. The method of claim 1, wherein the indication to generate the data entry is received in response to a query for retrieving the data object, the query comprising the field identifier and the field value.

4. The method of claim 3, wherein data map comprises a plurality of existing data entries, the method further comprises:
   determining if field identifier corresponds to an existing data entry of the data map based on matching the record locator associated with the data entry with an existing record locator associated with at least one of the plurality of existing data entries of the data map; and
   in response to determining the field identifier does not correspond to an existing data entry, encrypting the field identifier and field value and storing the data entry in the data map as an encrypted field identifier and field value in association with the record locator.

5. The method of claim 4, further comprising, if the field identifier does correspond to one of the plurality of existing data entries:
   decrypting and updating a value associated with the corresponding existing data entry with the field value of the data entry; and
   encrypt the updated value associated with the corresponding existing data entry.

6. The method of claim 1, wherein the indication to generate the data entry is received in response to storing the data object.

7. The method of claim 6, further comprising extracting a field identifier and field value from the data object based, at least in part, on the type of the data object.

8. The method of claim 7, wherein said extracting is performed by a plug-in module.

9. The method of claim 6, performing a reverse decomposition of the data object, wherein the data object is previously stored using a decomposition function based in part on one or more variable storage parameters.

10. The method of claim 9, wherein the field value corresponding to the field identifier is determined based in part on the reverse decomposition of the data object.

11. The method of claim 6, further comprising an indication to create the data map automatically in response to storing the data object, wherein creating the data map comprises generating the data entry.

12. The method of claim 1, wherein the one or more variable storage parameters includes at least one of a username, a user passphrase, a current security model, a type of the data object, a size of the data object, one or more security requirements, and one or more performance requirements.

13. The method of claim 1, wherein the one or more variable storage parameters includes at least a type of the data object.

14. The method of claim 13, wherein the type of data object is at least one of an image file, video file, and audio file.

15. A system for generating a data map a data map for retrieval of a data object, the system comprising:
   a plurality of data storage locations;
   a secure platform comprising one or more processors coupled to at least one memory, the secure platform configured to:
      receive an indication to generate a data entry for the data map, the data entry corresponding to a field identifier and a field value related to the field identifier;
      obfuscate the field identifier to generate a record locator associated with the data entry based, at least in part, on one or more variable storage parameters; and
      encrypt the field identifier and field value and storing the data entry in the data map as an encrypted field identifier and field value in association with the record locator.

16. The system of claim 15, wherein the indication to generate the data entry is received in response to a query for retrieving the data object, the query comprising the field identifier and the field value.

17. The system of claim 15, wherein the indication to generate the data entry is received in response to storing the data object.

18. The system of claim 17, further comprising extracting a field identifier and field value from the data object based, at least in part, on the type of the data object.

19. The system of claim 17, wherein said extracting is performed by a plug-in module.

* * * * *